(12) United States Patent
Li et al.

(10) Patent No.: US 12,134,177 B2
(45) Date of Patent: Nov. 5, 2024

(54) POWER TOOL

(71) Applicant: Nanjing Chervon Industry Co., Ltd., Nanjing (CN)

(72) Inventors: Yang Li, Nanjing (CN); Rui Zhan, Nanjing (CN); Zhongquan Xu, Nanjing (CN); Rong Wang, Nanjing (CN); Yi Zhang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 18/448,273

(22) Filed: Aug. 11, 2023

(65) Prior Publication Data
US 2024/0066679 A1 Feb. 29, 2024

(30) Foreign Application Priority Data

| Aug. 26, 2022 | (CN) | 202211033722.8 |
| Sep. 23, 2022 | (CN) | 202211161435.5 |
| Sep. 23, 2022 | (CN) | 202211161456.7 |
| Oct. 20, 2022 | (CN) | 202222757873.X |
| May 19, 2023 | (CN) | 202310584103.6 |

(51) Int. Cl.
*B25F 5/00* (2006.01)
*B25F 3/00* (2006.01)

(52) U.S. Cl.
CPC .............. *B25F 5/006* (2013.01); *B25F 5/008* (2013.01); *B25F 3/00* (2013.01)

(58) Field of Classification Search
CPC .. B25F 5/006; B25F 5/008; B25F 3/00; B25F 5/02; B25F 5/001; B25F 5/026
USPC ............. 173/73, 216, 217, 48, 178, 47, 176, 173/162.2, 162.1
See application file for complete search history.

(56) References Cited

U.S. PATENT DOCUMENTS

| 2013/0180747 | A1* | 7/2013 | Brown | B24B 23/04 173/145 |
| 2015/0034353 | A1* | 2/2015 | Huo | H02K 7/075 173/217 |
| 2015/0183107 | A1* | 7/2015 | Ito | B24B 45/006 279/141 |
| 2018/0029215 | A1* | 2/2018 | Zhong | B25F 5/006 |
| 2018/0283508 | A1* | 10/2018 | Aoki | B25F 5/02 |
| 2018/0335118 | A1* | 11/2018 | Gu | B25F 5/001 |
| 2019/0299387 | A1* | 10/2019 | Kotsuji | B25F 5/02 |

* cited by examiner

*Primary Examiner* — Jacob A Smith
(74) *Attorney, Agent, or Firm* — Greenberg Traurig, LLP

(57) ABSTRACT

A power tool includes a housing, a motor, a ball sleeve, an oscillating member with a mounting portion, and an output shaft rotating around an output shaft axis. The oscillating member and the ball sleeve are engaged in an engagement region on the oscillating member, and the geometric center of the engagement region is an engagement center. A first plane bisects the first bearing assembly along a direction of the output shaft axis, and a second plane bisects the second bearing assembly along the direction of the output shaft axis. The height from the engagement center to the first plane is a first height H1, the height from the engagement center to the second plane is a second height H2, and the ratio H1/H2 of the first height H1 to the second height H2 is greater than or equal to 0.5 and less than or equal to 1.4.

20 Claims, 25 Drawing Sheets

POWER TOOL

RELATED APPLICATION INFORMATION

This application claims the benefit under 35 U.S.C. § 119(a) of Chinese Patent Application No. CN202211033722.8, filed on Aug. 26, 2022, Chinese Patent Application No. CN 202211161456.7, filed on Sep. 23, 2022, Chinese Patent Application No. CN202211161435.5, filed on Sep. 23, 2022, Chinese Patent Application No. CN202222757873.X, filed on Oct. 20, 2022, and Chinese Patent Application No. CN 202310584103.6, filed on May 19, 2023, which applications are incorporated herein by reference in their entireties.

TECHNICAL FIELD

The present application relates to a power tool and, in particular, to an oscillating power tool.

BACKGROUND

As a power tool, an oscillating power tool generally drives the oscillation of a work attachment through an oscillating member so as to perform cutting, grinding, and other operations on an object. The high-frequency vibration of the oscillating member generates noise. When the oscillating power tool cuts a workpiece, the noise generated by the oscillating member is even greater, affecting the operating experience of an operator.

SUMMARY

The present application provides a power tool. The power tool includes a housing; a motor rotatable around a motor axis; a ball sleeve sleeved on a motor shaft and driven by the motor shaft to move; an oscillating member driven by the ball sleeve to oscillate; and an output shaft driven by the oscillating member to rotate around an output shaft axis, where the oscillating member includes a mounting portion sleeved on the output shaft. A first bearing assembly and a second bearing assembly are sleeved on the output shaft, where the first bearing assembly is located on an upper side of the mounting portion, and the second bearing assembly is located on a lower side of the mounting portion. The oscillating member and the ball sleeve are engaged in an engagement region on the oscillating member, and the geometric center of the engagement region is defined as an engagement center. A first plane bisects the thickness of the first bearing assembly along a direction of the output shaft axis, and the first plane is perpendicular to the output shaft axis; and a second plane bisects the thickness of the second bearing assembly along the direction of the output shaft axis, and the second plane is perpendicular to the output shaft axis. The height from the engagement center to the first plane is a first height H1, the height from the engagement center to the second plane is a second height H2, and the ratio H1/H2 of the first height H1 to the second height H2 is greater than or equal to 0.5 and less than or equal to 1.4.

In an example, the ratio H1/H2 of the first height H1 to the second height H2 is greater than or equal to 0.6 and less than or equal to 1.4.

In an example, the difference between the first height H1 and the second height H2 is less than or equal to 10 mm.

In an example, the first bearing assembly includes a first bearing, and the second bearing assembly includes a second bearing.

In an example, the first bearing assembly further includes a third bearing, where the third bearing is located above the first bearing.

In an example, the second bearing assembly further includes a fourth bearing, wherein the fourth bearing is located below the second bearing.

In an example, a third plane perpendicular to the output shaft axis exists, where the third plane bisects the thickness of the mounting portion along the direction of the output shaft axis, and the distance from the engagement center to the third plane is a third distance H3, where the third distance H3 is less than or equal to 12 mm.

In an example, the engagement center includes a first engagement center on a left side and a second engagement center on a right side.

In an example, the distance from the engagement center to the output shaft axis is a first radius R1, where the first radius R1 is less than or equal to 32 mm.

In an example, the oscillating member includes the mounting portion, the mounting portion is sleeved on an outer circumference of the output shaft, and the inner radius of the mounting portion is a second radius R2, where the ratio R2/R1 of the second radius R2 to the first radius R1 is greater than or equal to 0.34 and less than 1.

The present application provides a power tool. The power tool includes a housing; a motor rotatable around a motor axis; a ball sleeve sleeved on a motor shaft and driven by the motor shaft to move; an oscillating member driven by the ball sleeve to oscillate; and an output shaft driven by the oscillating member to rotate around an output shaft axis, where the oscillating member includes a mounting portion sleeved on the output shaft. A first bearing assembly and a second bearing assembly are sleeved on the output shaft, where the first bearing assembly is located on an upper side of the mounting portion, and the second bearing assembly is located on a lower side of the mounting portion. The oscillating member and the ball sleeve are engaged in an engagement region on the oscillating member, and the geometric center of the engagement region is defined as an engagement center. A first plane bisects the thickness of the first bearing assembly along a direction of the output shaft axis, and the first plane is perpendicular to the output shaft axis; and a second plane bisects the thickness of the second bearing assembly along the direction of the output shaft axis, and the second plane is perpendicular to the output shaft axis. The height from the engagement center to the first plane is a first height H1, the height from the engagement center to the second plane is a second height H2, and the difference between the first height H1 and the second height H2 is less than or equal to 10 mm.

In an example, the ratio H1/H2 of the first height H1 to the second height H2 is greater than or equal to 0.6 and less than or equal to 1.4.

In an example, the difference between the first height H1 and the second height H2 is greater than 3 mm and less than or equal to 10 mm.

In an example, the distance from the engagement center to the output shaft axis is a first radius R1, where the first radius R1 is less than or equal to 32 mm.

In an example, the oscillating member includes the mounting portion, the mounting portion is sleeved on an outer circumference of the output shaft, and the inner radius of the mounting portion is a second radius R2, where the ratio R2/R1 of the second radius R2 to the first radius R1 is greater than or equal to 0.34 and less than 1.

The present application further provides a power tool. The power tool includes a housing; a power mechanism including a motor and a motor shaft rotatable around a motor axis; a polarization mechanism driven by the motor shaft to oscillate; an output mechanism drivingly connected to the polarization mechanism; and a shock absorbing mechanism used for performing shock absorbing on the power tool. The motor is a brushless motor. The shock absorbing mechanism includes a first shock absorbing assembly and a second shock absorbing assembly, and each of the first shock absorbing assembly and the second shock absorbing assembly includes at least one shock absorber. The maximum span formed by the first shock absorbing assembly and the second shock absorbing assembly along a direction of the motor axis is defined as a first length T1, where the first length T1 is greater than or equal to 110 mm.

In an example, the first shock absorbing assembly and the second shock absorbing assembly are located on the left side of the motor shaft and basically arranged along the front and rear direction, and the first shock absorbing assembly is located on the front side of the second shock absorbing assembly.

In an example, the output mechanism includes an output shaft for outputting power, and the output shaft basically extends along an output shaft axis; the shock absorbing assembly farthest from the output shaft axis is defined as the farthest shock absorbing assembly, and the maximum distance from the farthest shock absorbing assembly to the output shaft axis is a second length T2, where the second length T2 is greater than or equal to 120 mm.

In an example, the power tool further includes a third shock absorbing assembly located on the upper side of the motor shaft.

In an example, the minimum distance between the first shock absorbing assembly and the second shock absorbing assembly is defined as a third length T3, where the third length T3 is greater than or equal to 30 mm.

In an example, the length from the frontmost side of the power tool to the rearmost side of the power tool is the overall length L, and the ratio of the first length T1 to the overall length L is greater than or equal to 0.33.

In an example, the power tool further includes a battery pack, and the minimum distance from the output mechanism at the frontmost end of the power tool to the battery pack is defined as a fourth distance L4, where the ratio of the first length T1 to the fourth distance L4 is greater than or equal to 0.58.

In an example, the first length T1 is less than or equal to 160 mm.

In an example, the first length T1 is less than or equal to 150 mm.

In an example, the first length T1 is less than or equal to 145 mm.

The present application provides a power tool. The power tool includes a housing; a power mechanism including a motor and a motor shaft; a polarization mechanism driven by the motor shaft to oscillate; an output mechanism drivingly connected to the polarization mechanism and including an output shaft for outputting power, where the output shaft basically extends along an output shaft axis, and the motor is a brushless motor; and a shock absorbing mechanism used for performing shock absorbing on the power tool and including a first shock absorbing assembly and a second shock absorbing assembly, where the minimum distance between the first shock absorbing assembly and the second shock absorbing assembly is defined as a third length T3, where the third length T3 is greater than or equal to 30 mm. Each of the first shock absorbing assembly and the second shock absorbing assembly includes at least one shock absorber. The first shock absorbing assembly has a first shock absorbing center C1, and the second shock absorbing assembly has a second shock absorbing center C2. The distance from the first shock absorbing center C1 to the output shaft axis is defined as a first distance L1, and the distance from the second shock absorbing center C2 to the first shock absorbing center C1 is defined as a second distance L2, where the ratio of the first distance L1 to the second distance L2 is less than or equal to 0.27.

In an example, the ratio of the first distance L1 to the second distance L2 is less than or equal to 0.26.

In an example, the first distance L1 is greater than or equal to 10 mm and less than or equal to 40 mm.

In an example, the second distance L2 is greater than or equal to 60 mm and less than or equal to 130 mm.

In an example, the shock absorbing assembly farthest from the output shaft axis is defined as the farthest shock absorbing assembly, and the maximum distance from the farthest shock absorbing assembly to the output shaft axis is a second length T2, where the second length T2 is greater than or equal to 120 mm.

In an example, the ratio of the first distance L1 to the second distance L2 is greater than or equal to 0.18.

In an example, the ratio of the first distance L1 to the second distance L2 is greater than or equal to 0.20.

The present application provides a power tool. The power tool includes a housing; a motor rotatable around a motor axis; a ball sleeve sleeved on a motor shaft and driven by the motor shaft to move; an oscillating member driven by the ball sleeve to oscillate; and an output shaft driven by the oscillating member to rotate around an output shaft axis. The oscillating member and the ball sleeve are engaged in an engagement region on the oscillating member, the geometric center of the engagement region is defined as an engagement center, and the distance from the engagement center to the output shaft axis is a first radius R1, where the first radius R1 is less than or equal to 32 mm.

In an example, the first radius R1 is less than or equal to 31 mm.

In an example, the first radius R1 is less than or equal to 30 mm.

In an example, the first radius R1 is less than or equal to 29 mm.

In an example, the oscillating member includes the mounting portion, the mounting portion is sleeved on an outer circumference of the output shaft, and the inner radius of the mounting portion is a second radius R2, where the ratio R2/R1 of the second radius R2 to the first radius R1 is greater than or equal to 0.34 and less than 1.

In an example, the ratio R2/R1 of the second radius R2 to the first radius R1 is greater than or equal to 0.36 and less than 1.

In an example, the ratio R2/R1 of the second radius R2 to the first radius R1 is greater than or equal to 0.36 and less than or equal to 0.6.

In an example, the maximum diameter D of the ball sleeve is greater than or equal to 14 mm and less than or equal to 30 mm.

In an example, the maximum diameter D of the ball sleeve is greater than or equal to 16 mm and less than or equal to 25 mm.

In an example, the maximum diameter D of the ball sleeve is greater than or equal to 17 mm and less than or equal to 23 mm.

The present application further provides an oscillating power tool. The oscillating power tool includes a housing; a power mechanism including a motor and a motor shaft rotatable around a motor axis; a polarization mechanism driven by the motor shaft to oscillate; and an output mechanism including a mounting assembly drivingly connected to the polarization mechanism and used for mounting a work attachment. The output mechanism is drivingly connected to the polarization mechanism and further includes an output shaft; and a heat dissipation mechanism including a fan. The polarization mechanism includes a support assembly and an oscillating member. The support assembly includes a ball sleeve sleeved on the motor shaft. The rotation of the motor shaft drives the oscillating member through the ball sleeve to oscillate. The oscillating member drives the output shaft and the work attachment connected to the output shaft to oscillate. The fan includes fan blades, a base plate, and a support portion. The fan blades are arc-shaped. The fan blade includes a root and a tail, the root is connected to the support portion, an airflow flows out along the tail, and the fan blades are partially integrated into the base plate and partially exposed from the base plate.

In an example, a circle formed by connecting tails of multiple fan blades is defined as an outer circle, the diameter of the base plate is a first diameter d1, and the diameter of the outer circle is a second diameter d2, where the ratio of the second diameter d2 to the first diameter d1 is greater than or equal to 1.05 and less than or equal to 1.18.

In an example, the heat dissipation mechanism further includes an air guide hood, and the minimum distance M between the fan and the air guide hood is greater than or equal to 2 mm and less than or equal to 4 mm.

In an example, the circle formed by connecting the tails of multiple fan blades is defined as the outer circle, the airflow flows out along the tail of the fan blade at a speed v, and the included angle β between the tangent to the outer circle at the tail and the speed v is greater than or equal to 35 degrees and less than or equal to 60 degrees.

In an example, the mounting assembly includes a first element and a clamping piece, where a connecting pin connects the first element to the clamping piece, and the up-and-down movement of the first element drives the clamping piece to be opened and closed.

In an example, the first element includes a first protruding portion, a second protruding portion, and a connecting portion, where the first protruding portion extends along a first straight line, the second protruding portion extends along a second straight line, and the first straight line is basically parallel to the second straight line; the connecting portion connects the first protruding portion to the second protruding portion along a direction of a third straight line, the third straight line is perpendicular to the first straight line and the second straight line, and the first protruding portion, the second protruding portion, and the connecting portion form a U shape.

In an example, a second middle plane is provided along the geometric center of the connecting portion and perpendicular to the connecting portion, the first protruding portion and the second protruding portion are separately located on two sides of the second middle plane, and the first protruding portion and the second protruding portion are not completely symmetrical about the second middle plane.

In an example, the first protruding portion has an opening, and the second protruding portion does not have openings symmetrical about the second middle plane.

In an example, the maximum rotational speed of the motor is greater than or equal to 19000 RPM and less than or equal to 21000 RPM.

In an example, the maximum oscillation angle of the work attachment is greater than or equal to 1.9 degrees and less than or equal to 2.3 degrees.

DETAILED DESCRIPTION

Figure 1:
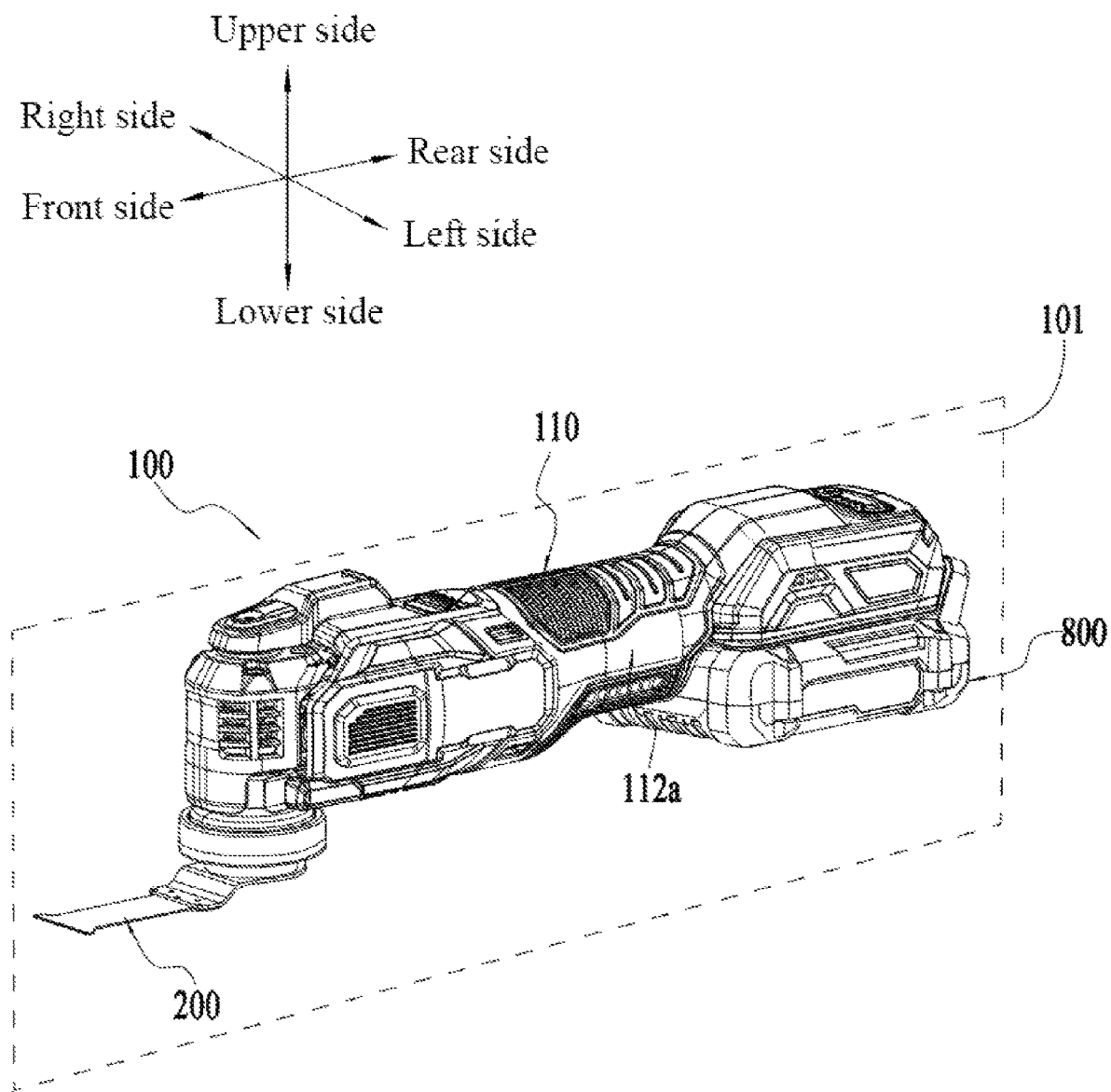
FIG. 1 is a perspective view of a power tool in the present application.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" "and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

As shown in FIG. 1, a power tool 100 in the present application may be a hand-held oscillating power tool, such as an oscillating multifunctional tool, where the power tool 100 includes multiple work attachments 200, such as a blade, a triangular sander, a metal saw blade, a woodworking saw blade, and a silicon carbide saw blade. Through these different work attachments 200, the power tool 100 can implement functions such as sawing, sanding, filing, and scraping.

As shown in FIGS. 1 to 4, the power tool 100 in the present invention includes a tool body 100a. The tool body 100a includes a housing 110, a power mechanism 300, a polarization mechanism 400, an output mechanism 500, a heat dissipation mechanism 600, a shock absorbing mechanism 700, and a power source. The power source in the present application is a battery pack 800, and the battery pack 800 may be mounted to a battery pack coupling portion 801. In other examples, the power source may include a plug and a cable of external mains power. The power tool 100 further includes a main control assembly 120 used for controlling the power tool 100 and connected to the power source.

Figure 2:
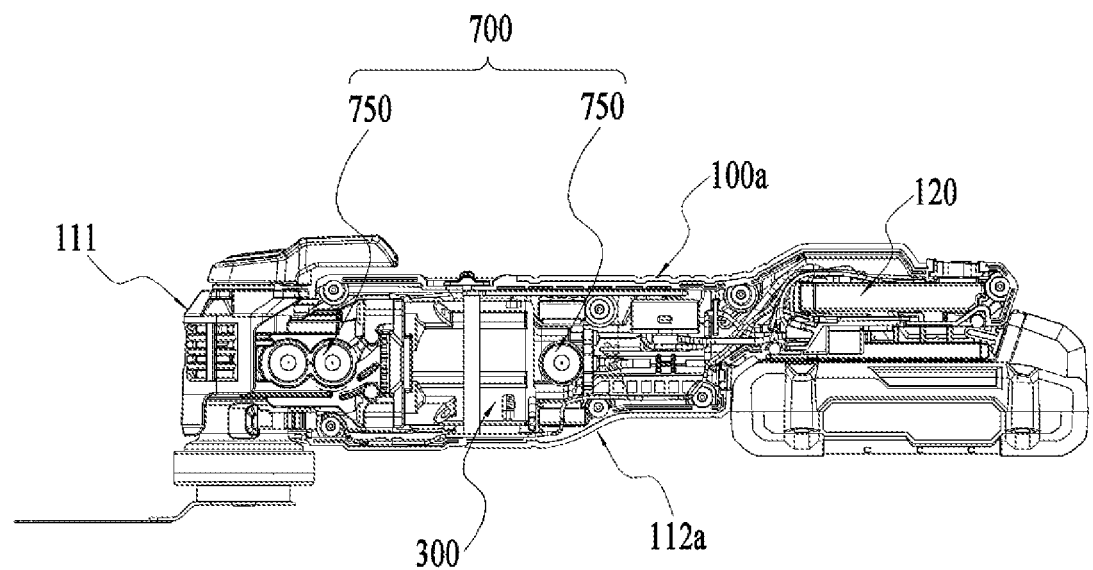
FIG. 2 is a side view of the power tool in FIG. 1 with a left housing opened.
Figure 3:
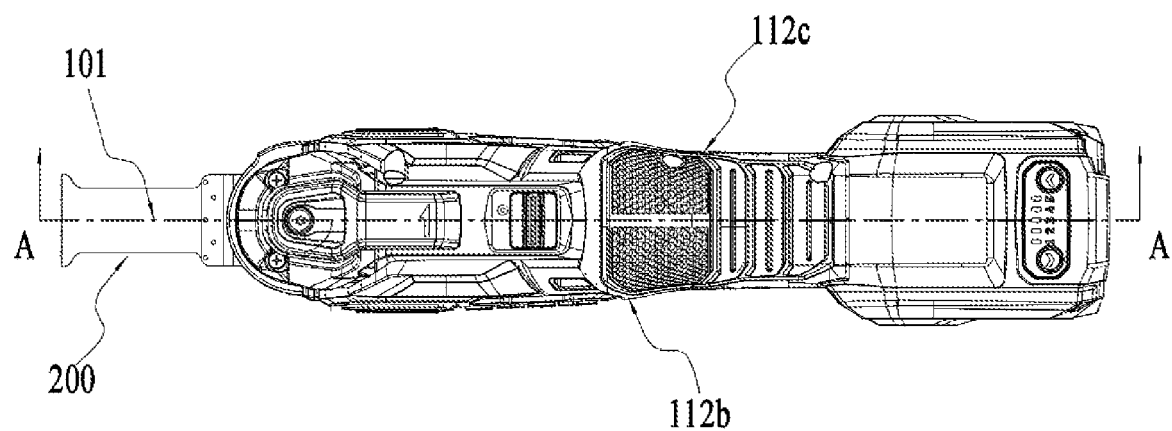
FIG. 3 is a top view of the power tool in FIG. 1.
Figure 4:
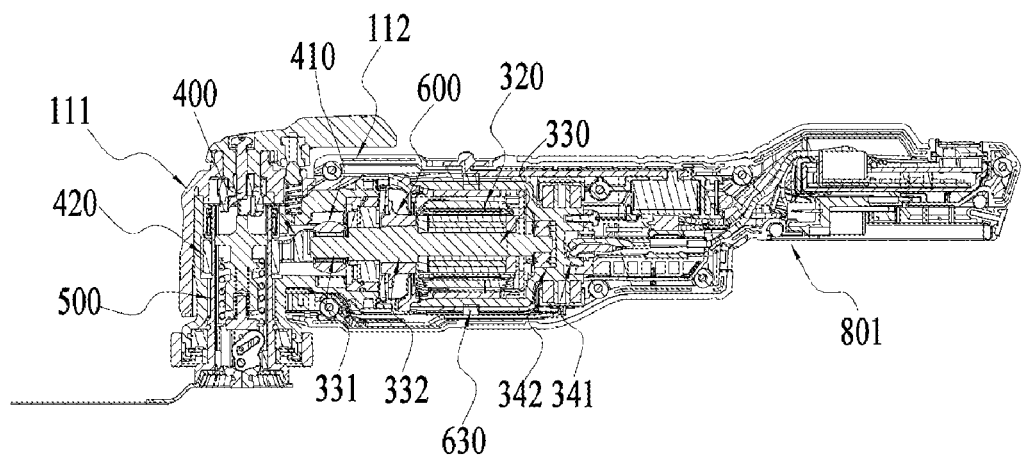
FIG. 4 is a sectional view taken along A-A in FIG. 3.

As shown in FIGS. 2 to 4, the housing 110 forms an accommodation space. The housing 110 includes a first housing 111 and a second housing 112, where the first housing 111 and the second housing 112 together form the housing of the tool, and the second housing 112 is formed with a grip 112*a* for a user to hold. The first housing 111 may partially extend into the second housing 112 so that the first housing 111 and the second housing 112 are combined into a whole. The first housing 111 may not extend into the second housing 112, and the first housing 111 and the second housing 112 may be connected into a whole through other connecting components such as screws.

Figure 5:
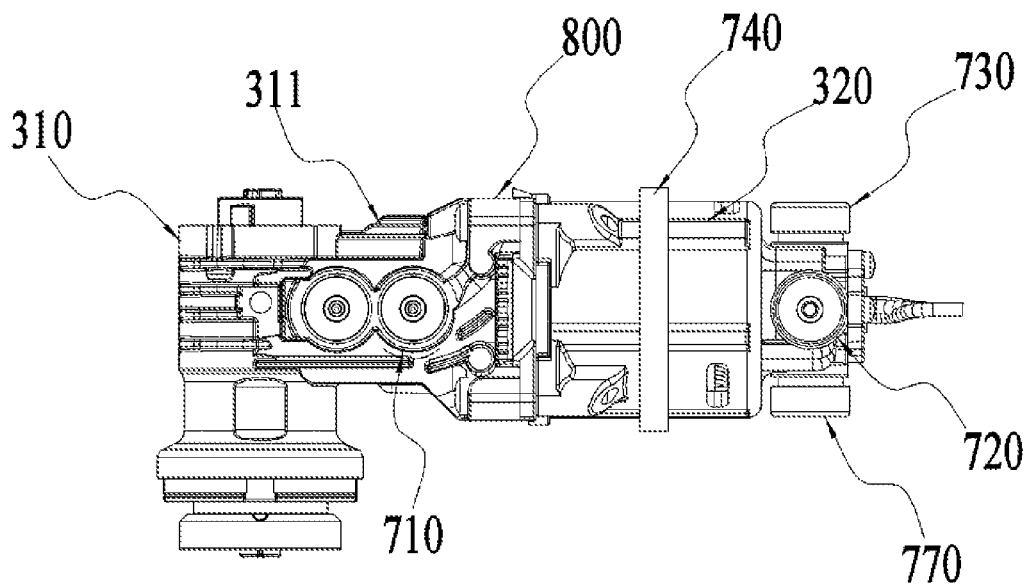
FIG. 5 is a schematic view of a power mechanism, a polarization mechanism, and an output mechanism of the power tool in FIG. 1.
Figure 6:
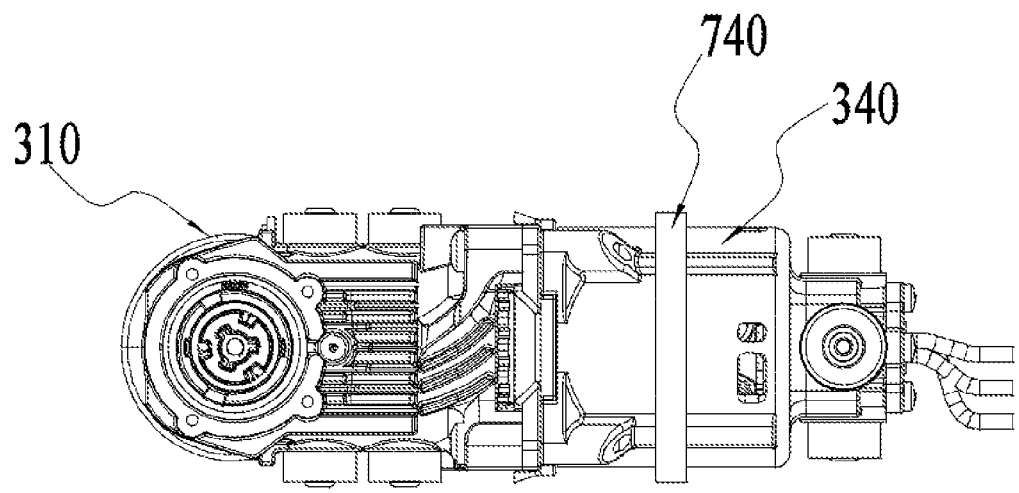
FIG. 6 is a top view of the structure shown in FIG. 5.

As shown in FIGS. 4 to 6, the power mechanism 300 in the example of the present application includes a power housing, where the power housing includes a motor housing 340 and a transmission housing 310, where the polarization mechanism 400 and the output mechanism 500 are accommodated in the transmission housing 310, and a motor 320 and a motor shaft 330 configured to be a drive shaft are accommodated in the motor housing 340. The transmission housing 310 is at least partially coated by the first housing 111 and extends from the first housing 111 into the second housing 112.

As shown in FIG. 3, the second housing 112 may specifically include a left housing 112*b* and a right housing 112*c*, where the left housing 112*b* and the right housing 112*c* are basically symmetrical about a first middle plane 101 as shown in FIGS. 1 and 3 so that the grip 112*a* formed by the left housing 112*b* and the right housing 112*c* is also basically symmetrical about the first middle plane 101, and the first housing 111 is also basically symmetrical about the first middle plane 101.

As shown in FIG. 4, the motor housing 340 is disposed in the second housing 112, and the motor shaft 330 extends into the transmission housing 310 and is connected to the polarization mechanism 400. The motor shaft 330 is an eccentric shaft and specifically includes a first shaft portion 331 and a second shaft portion 332. A centerline of the second shaft portion 332 is spaced apart from a centerline of the first shaft portion 331 by an equal distance, the first shaft portion 331 is drivingly connected to the polarization mechanism 400, and the second shaft portion 332 is connected to the heat dissipation mechanism 600. In another example, the motor shaft 330 may be connected to the motor 320 through a conventional transmission mechanism, where the motor shaft 330 is an eccentric shaft. A support cavity 342 is provided on the inner side of the motor housing 340 and used for mounting a bearing supporting the motor shaft 330.

The polarization mechanism 400 in this example is used for directly generating vibration. As shown in FIGS. 4 to 8, the polarization mechanism 400 includes a support assembly 410 and an oscillating member 420, where the oscillating member 420 is specifically a shift fork. Specifically, as shown in FIGS. 8 to 11, the support assembly 410 in this example includes a bearing 411 and a ball sleeve 412, where the ball sleeve 412 is sleeved on the first shaft portion 331 of the motor shaft 330 through the bearing 411. When the second shaft portion 332 rotates, the bearing 411 is driven by the first shaft portion 331 to reciprocate left and right in the left and right direction perpendicular to the first middle plane 101. The bearing 411 in this example is a double row ball bearing to improve the strength with which the oscillating member 420 is supported.

The motor shaft 330 is rotatable around a motor axis 1301. It is to be noted that, since the motor shaft 330 is an eccentric shaft, the second shaft portion 332 of the motor axis 1301 has a different centerline from the first shaft portion 331 of the motor 320. The motor axis 1301 mentioned in the present application actually refers to a rotation axis of the rotor of the motor 320, which is also a rotation axis of the heat dissipation mechanism 600 in this example. The motor 320 is a brushless motor.

Figure 8:
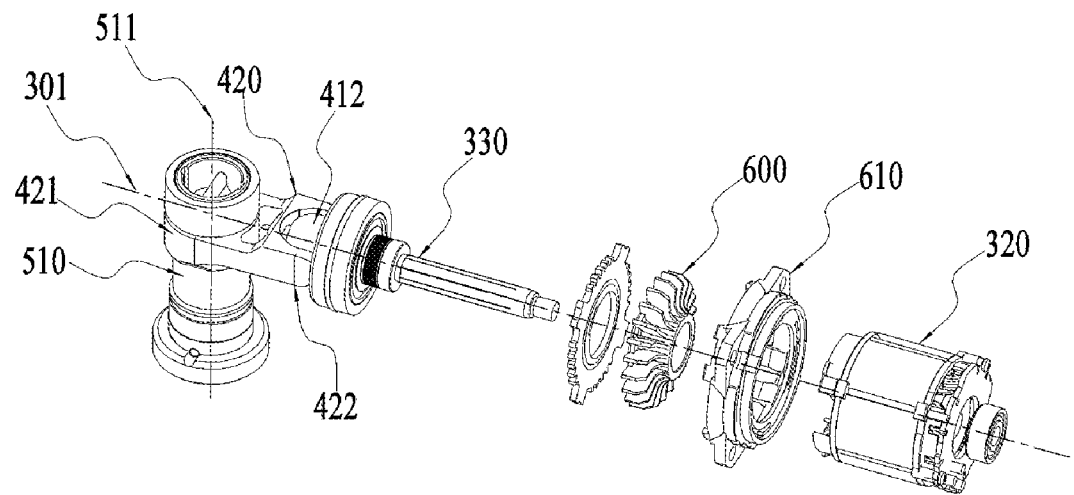
FIG. 8 is a schematic view of the assembly of an output shaft, a polarization mechanism, and a power mechanism.

As shown in FIG. 8, the power tool 100 further includes an air guide hood 610 disposed around the heat dissipation mechanism 600 and partially or fully overlapping with the heat dissipation mechanism 600 in an axial direction to guide the airflow of an airflow element of the heat dissipation mechanism 600 towards an air outlet.

Figure 9:
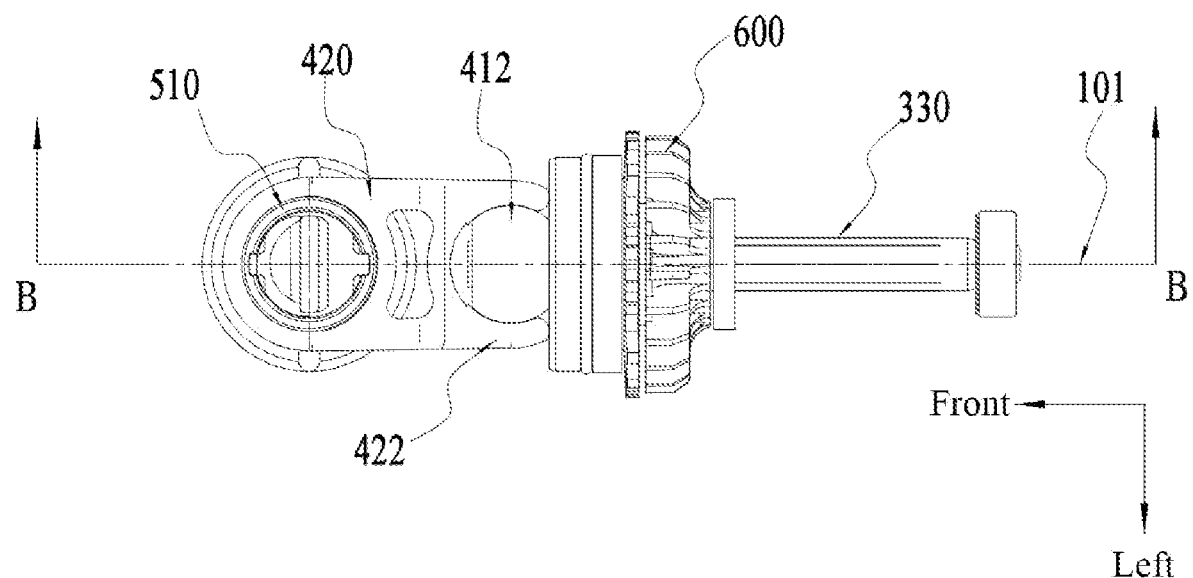
FIG. 9 is a top view when a polarization mechanism and a motor shaft are assembled.
Figure 10:
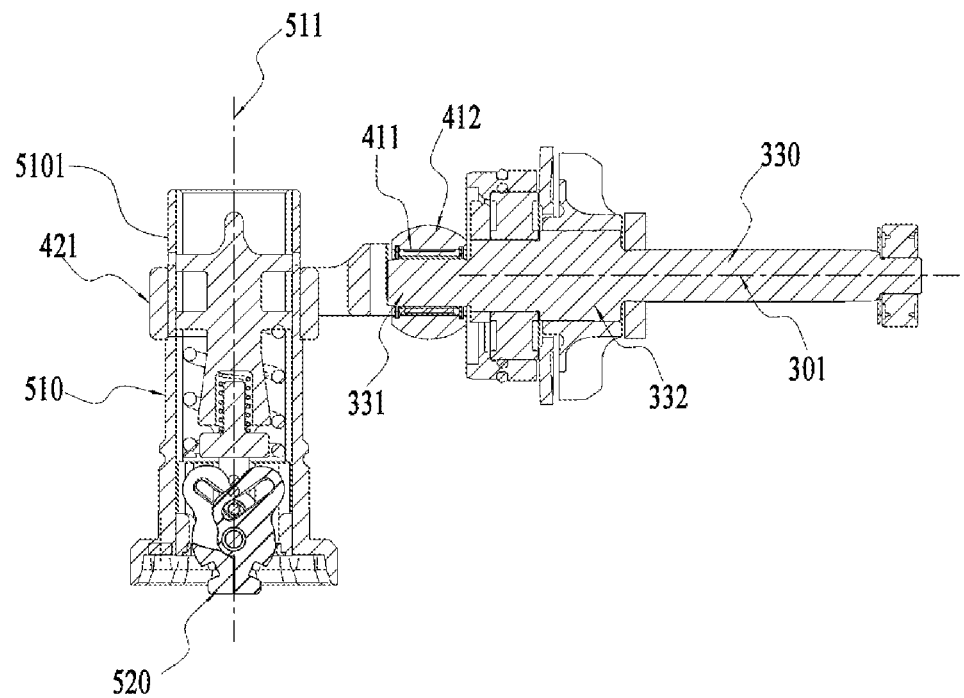
FIG. 10 is a sectional view taken along B-B in FIG. 9.

As shown in FIGS. 9 and 10, the ball sleeve 412 is sleeved on the outside of the bearing 411 and is rollably connected to the bearing 411. The ball sleeve 412 has a partial outer circular surface, and the oscillating member 420 includes a partial inner circumferential surface mating with the ball sleeve 412, where the partial inner circumferential surface of the oscillating member 420 is sleeved on the partial outer circular surface and the oscillating member 420 can be driven by the ball sleeve 412 to move.

Referring to FIG. 10, the output mechanism 500 in this example includes an output shaft 510 for outputting power, where the output shaft 510 that is not in a working state has an output shaft axis 511 substantially extending in a vertical direction. The oscillating member 420 includes a mounting portion 421 and an oscillating fork 422. The oscillating fork 422 is sleeved outside the partial outer circular surface of the ball sleeve 412 and is at least rotatable relative to the ball sleeve 412, and the mounting portion 421 forms a sleeve 424 (shown in FIG. 13) sleeved on the output shaft 510 of the output mechanism 500. Referring to FIG. 9, when the oscillating fork 422 is not in operation, two fork rods of the oscillating fork 422 are separately located on the left and right sides of the first middle plane 101. Therefore, when the ball sleeve 412 moves, the ball sleeve 412 repeatedly strikes the fork rods on the left and right sides in the left and right direction so that the oscillating fork 422 oscillates left and right, the output shaft 510 is driven by the oscillating fork 422 to oscillate within an oscillation range, and finally the work attachment 200 is driven to oscillate. It is to be understood that in this example, a direction F of an exciting force of the polarization generated by the power tool 100 in operation is basically perpendicular to the first middle plane 101. In other words, the work attachment 200 vibrates in a reciprocating manner along the direction basically perpendicular to the first middle plane 101.

Referring to FIG. 10, the output mechanism 500 further includes a mounting assembly 520 disposed on the output shaft 510 and drivingly connected to the oscillating member 420 through the output shaft 510. Multiple work attachments 200 are selectively mounted and connected to the mounting assembly 520. The mounting assembly 520 in this example is a clamp.

The oscillating multifunctional tool in this example vibrates mainly in the following manner: the eccentric shaft drives the bearing 411 and the ball sleeve 412 to rotate and the rotating ball sleeve 412 repeatedly strikes the oscillating member 420. Therefore, the whole formed by the bearing 411, the ball sleeve 412, and the oscillating member 420, that is, the polarization mechanism 400, may be considered as a vibration source.

Figure 11:
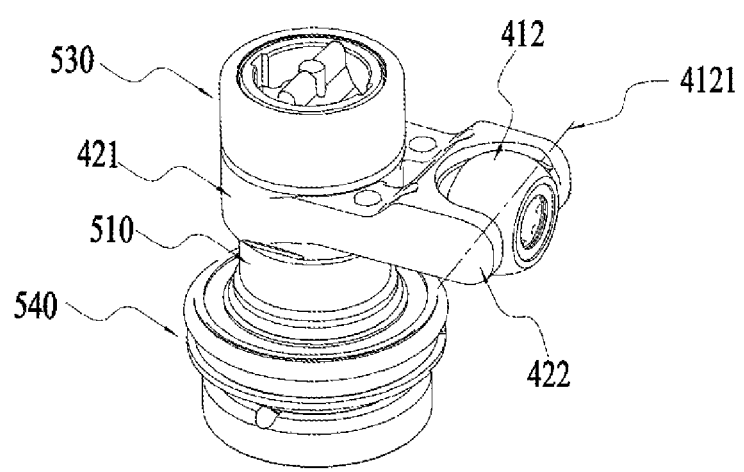
FIG. 11 is a perspective view of part of the structure of a polarization mechanism.
Figure 12:
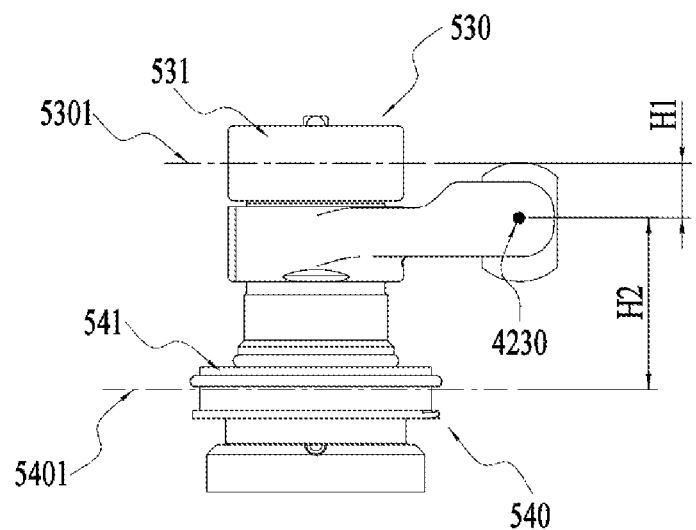
FIG. 12 is a side view of the structure shown in FIG. 11.

As shown in FIGS. 11 and 12, a first bearing assembly 530 and a second bearing assembly 540 are sleeved on the output shaft 510, where the first bearing assembly 530 is located on the upper side of the mounting portion 421, and the second bearing assembly 540 is located on the lower side of the mounting portion 421. Specifically, a first bearing 531 is disposed on the upper side of the oscillating member 420, a second bearing 541 is disposed on the lower side of the oscillating member 420, and both the first bearing 531 and the second bearing 541 are sleeved on the output shaft 510. Each bearing in the first bearing assembly 530 and the second bearing assembly 540 may be a ball bearing, a needle roller bearing, or the like, which is not limited here.

A first plane 5301 bisects the height of the first bearing assembly 530 along the direction of the output shaft axis 511, and the first plane 5301 basically extends along the front and rear direction. A second plane 5401 bisects the height of the second bearing assembly 540 along the direction of the output shaft axis 511, and the second plane 5401 basically extends along the front and rear direction.

Figure 13:
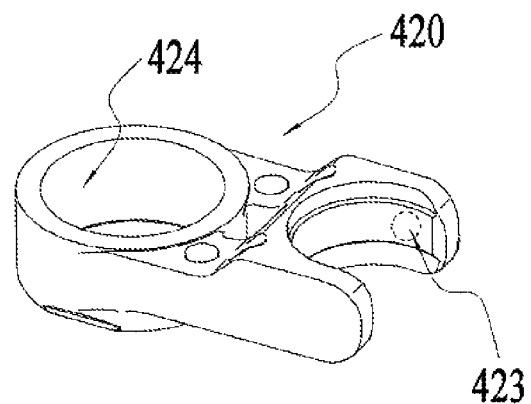
FIG. 13 is a perspective view of a shock absorber.
Figure 14:
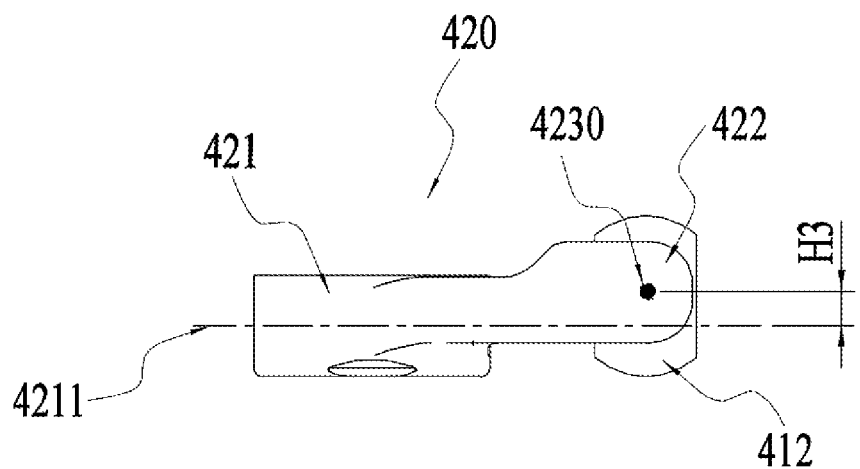
FIG. 14 is a side view of the engagement of a shock absorber with a ball sleeve.
Figure 15:
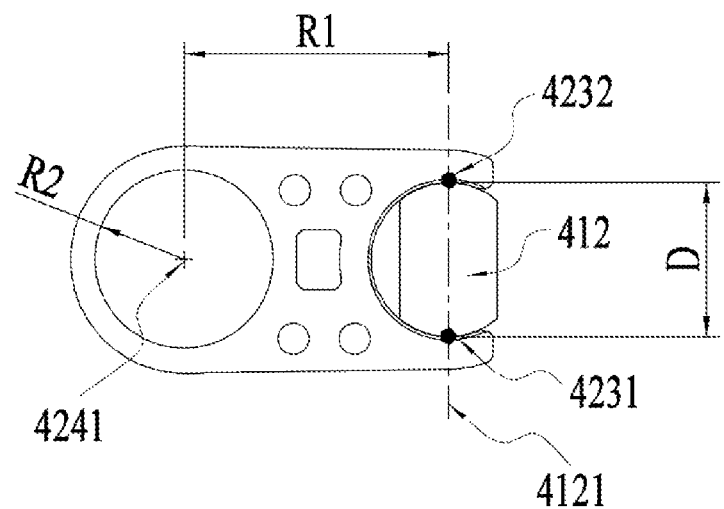
FIG. 15 is a top view of the engagement of a shock absorber with a ball sleeve.

As shown in FIGS. 13 to 15, the ball sleeve 412 and the oscillating fork 422 are engaged in an engagement region 423, and the geometric center of the engagement region 423 is an engagement center 4230. In this example, since the engagement region 423 is symmetrical about the first middle plane 101, the engagement center 4230 includes a first engagement center 4231 on the left side and a second engagement center 4232 on the right side. The sleeve 424 of the mounting portion 421 has a second radius R2, the sleeve 424 has a sleeve center 4241, and the line connecting the first engagement center 4231 and the second engagement center 4232 of the oscillating fork 422 is an engagement centerline 4121 (shown in FIG. 11).

As shown in FIG. 12, the distance between the first plane 5301 and the engagement center 4230 is defined as a first height H1, the distance between the second plane 5401 and the engagement center 4230 is defined as a second height H2, and the ratio H1/H2 of the first height H1 to the second height H2 is greater than or equal to 0.5 and less than or equal to 1.4. In an example, the ratio H1/H2 of the first height H1 to the second height H2 is greater than or equal to 0.6 and less than or equal to 1.4. The difference between the first height H1 and the second height H2 is less than or equal to 10 mm.

In an example, the first height H1 is 13 mm, the second height H2 is 20 mm, the ratio of the first height H1 to the second height H2 is 0.65, and the difference between the first height H1 and the second height H2 is 7 mm. In another example, the first height H1 is 15 mm, the second height H2 is 18 mm, the ratio of the first height H1 to the second height H2 is 0.83, and the difference between the first height H1 and the second height H2 is 3 mm. That is to say, in some examples, the difference between the first height H1 and the second height H2 is less than or equal to 3 mm; in some examples, the difference between the first height H1 and the second height H2 is greater than 3 mm and less than or equal to 7 mm; in some examples, the difference between the first height H1 and the second height H2 is greater than 7 mm and less than or equal to 10 mm; in some examples, the difference between the first height H1 and the second height H2 is greater than 3 mm and less than or equal to 10 mm.

As shown in FIG. 14, a third plane 4211 perpendicular to the output shaft axis 511 exists, where the third plane 4211 bisects the mounting portion 421 along the direction of the output shaft axis 511, and the distance from the engagement center 4230 to the third plane is a third distance H3, where the third distance H3 is less than or equal to 12 mm.

Figure 16:
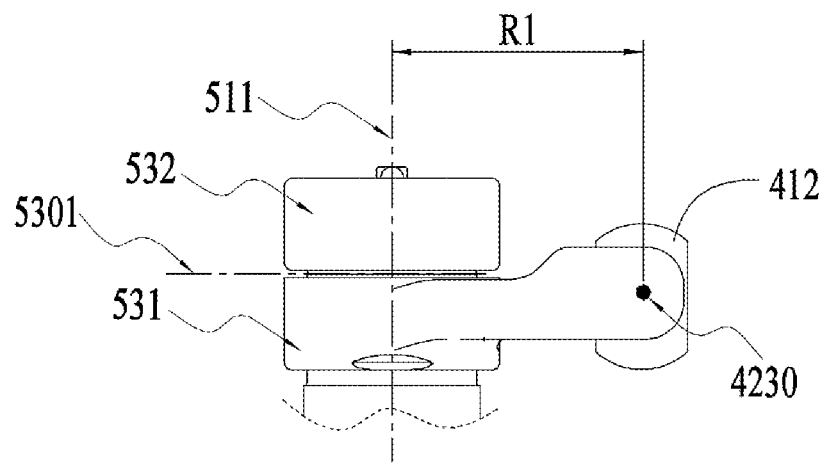
FIG. 16 is a schematic view illustrating that a first bearing assembly includes two bearings in an example.

In an example, as shown in FIG. 16, the first bearing assembly 530 includes the first bearing 531 and a third bearing 532, where the third bearing 532 is located above the first bearing 531. In this case, the first plane 5301 bisects the total thickness of the first bearing 531 and the third bearing 532 along the direction of the output shaft axis 511. That is to say, for the first bearing assembly 530, the first plane 5301 is a middle plane between the uppermost surface of the bearing on the upper side and the lowermost surface of the bearing on the lower side in the first bearing assembly 530. The same goes for the second bearing assembly 540 and the second plane 5401. In an example, the second bearing assembly 540 further includes a fourth bearing (not shown in the figure), where the fourth bearing is located below the second bearing 541.

In the existing art, the ratio of the first height H1 to the second height H2 is generally configured to be less than 0.5, causing a large difference in distance between the mounting portion 421 and the two bearing assemblies located on two sides of the mounting portion 421. In this case, the shock absorbing effect provided by the first bearing assembly 530 and the second bearing assembly 540 to the output shaft 510 is unbalanced, the effects of the upper and lower shock absorbing assemblies are not fully utilized, and the noise generated by the vibration of the output shaft 510 is excessively big.

Through creative work, calculation, and reasoning, the applicant found that the relative magnitudes of the first height H1 and the second height H2 have an effect on the vibration and noise of the power tool 100 and verified the preceding inventive discovery of the applicant through simulations and experiments. The relative positions between the bearing assemblies and the oscillating member 420 are limited above so that the stability of the output shaft 510 is increased, the noise generated when the oscillating member 420 drives the output shaft 510 to rotate is reduced, and the structural relationship between the output shaft 510, the oscillating member 420, the first bearing assembly 530, and the second bearing assembly 540 is achievable. The ratio of the first height H1 to the second height H2 may be adjusted by increasing the thickness of the first bearing 531 and/or reducing the thickness of the second bearing 541, thereby reducing the vibration and noise of the whole machine.

Referring to FIGS. 13 to 16, the oscillating member 420 and the ball sleeve 412 are engaged in the engagement region 423 on the oscillating member 420, the geometric center of the engagement region 423 is defined as the engagement center 4230, and the distance between the engagement center 4230 and the output shaft axis 511 in the front and rear direction is a first radius R1, where the first radius R1 is less than or equal to 32 mm. In an example, the first radius R1 is less than or equal to 31 mm. In an example, the first radius R1 is less than or equal to 30 mm. In some examples, the first radius R1 may be 28 mm, 28.5 mm, 29 mm, or 29.5 mm.

As shown in FIG. 15, the oscillating member 420 includes the mounting portion 421, the mounting portion 421 is sleeved on an outer circumference 5101 of the output shaft 510, and the inner radius of the mounting portion 421 is a second radius R2, where the ratio R2/R1 of the second radius R2 to the first radius R1 is greater than or equal to 0.34 and less than 1. In some examples, the ratio R2/R1 of the second radius R2 to the first radius R1 is greater than or equal to 0.36 and less than 1. In some examples, the ratio R2/R1 of the second radius R2 to the first radius R1 is greater than or equal to 0.36 and less than 0.6. In an example, the first radius R1 is about 28.5 mm, the second radius R2 is about 11 mm, and the ratio R2/R1 of the second radius R2 to the first radius R1 is 0.387.

The first radius R1 may be understood as the oscillation radius of the ball sleeve 412, so the first radius R1 is also the distance from the output shaft axis 511 to the engagement center 4230 of the oscillating member 420. In the existing art, the first radius R1 is generally greater than 32 mm. In the present application, the value of the first radius R1 is limited so that the stiffness and natural frequency of the oscillating member 420 can be improved, the deformation range of the ball sleeve 412 can be reduced, and the effect of noise reduction can be achieved.

The maximum diameter D of the ball sleeve 412 is greater than or equal to 14 mm and less than or equal to 30 mm. In some examples, the maximum diameter D of the ball sleeve 412 is greater than or equal to 16 mm and less than or equal to 25 mm. In some examples, the maximum diameter D of the ball sleeve 412 is greater than or equal to 17 mm and less than or equal to 23 mm. In some examples, the maximum diameter D of the ball sleeve 412 is about 18 mm, 19 mm, or 20 mm.

The shock absorbing mechanism 700 of the power tool 100 is described below. The shock absorbing mechanism 700 is used for performing shock absorbing on the power tool 100 so that the operator can have a better grip experience when holding the grip 112a and is less likely to be fatigued after the long-term operation. The shock absorbing mechanism 700 is provided between the power housing and the inner wall of the housing and used for mitigating or reducing the effect of the vibration of the whole machine in the running process on the power mechanism 300. In this example, the shock absorbing mechanism 700 includes at least two shock absorbing assemblies 750 in different dimensions, where the multiple shock absorbing assemblies 750 separately surround the transmission housing 310 and/or the motor housing 340 and are used for separately damping forces in different directions. That is to say, at least two shock absorbing assemblies 750 are separately provided between the power housing and the inner wall of the housing.

Figure 17:
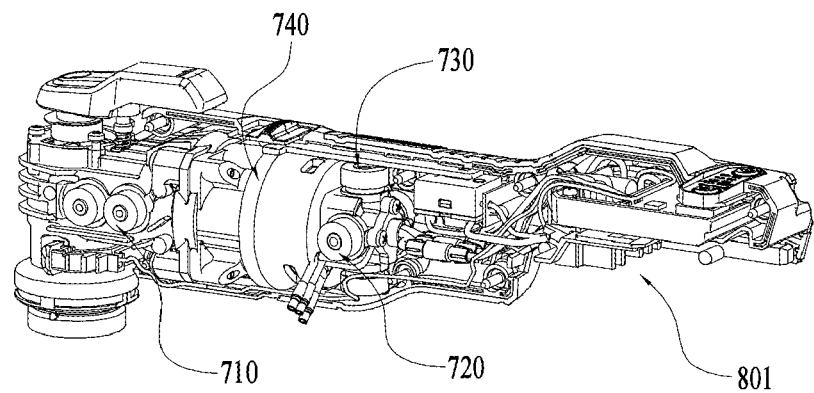
FIG. 17 is a perspective view of the structure shown in FIG. 2.

As shown in FIG. 17, the left housing 112b of the power tool 100 is disassembled to expose a first shock absorbing assembly 710, a second shock absorbing assembly 720, a third shock absorbing assembly 730, and a fourth shock absorbing assembly 740. The first shock absorbing assembly 710 and the second shock absorbing assembly 720 are located on the left side of the motor shaft 330 and basically arranged along the front and rear direction, and the first shock absorbing assembly 710 is located on the front side of the second shock absorbing assembly 720. The third shock absorbing assembly 730 is located on the upper side of the motor shaft 330 and also on the upper side of the motor axis 1301.

The first shock absorbing assembly 710 is located on the front side of the power tool 100 and is close to the output mechanism 500. In this example, the first shock absorbing assembly 710 is located between the output shaft axis 511 and the motor 320 in the front and rear direction. That is to say, the projection of the first shock absorbing assembly 710 on the first middle plane 101 is located between the output shaft axis 511 and the motor 320.

The second shock absorbing assembly 720 is located on the rear side of the first shock absorbing assembly 710. In this example, the second shock absorbing assembly 720 is located on the rear side of the motor 320. It is to be noted that the motor 320 mentioned here does not include the motor shaft 330, and the second shock absorbing assembly 720 may partially coincide with the motor shaft 330 in the direction of the motor axis 1301. In this example, the second shock absorbing assembly 720 is located between the motor 320 and the battery pack 800, that is to say, the second shock absorbing assembly 720 is located between the motor 320 and the battery pack coupling portion 801.

In this example, the first shock absorbing assembly 710 includes a first shock absorber 711 and a second shock absorber 712. The first shock absorber 711 and the second shock absorber 712 are arranged basically along the front and rear direction, and the first shock absorber 711 is located on the front side of the second shock absorber 712. In this example, the second shock absorbing assembly 720 includes a third shock absorber 721. That is to say, in this example, the first shock absorbing assembly 710 is composed of two shock absorbers 701 (shown in FIG. 19), while the second shock absorbing assembly 720 includes only one shock absorber 701.

Figure 19:
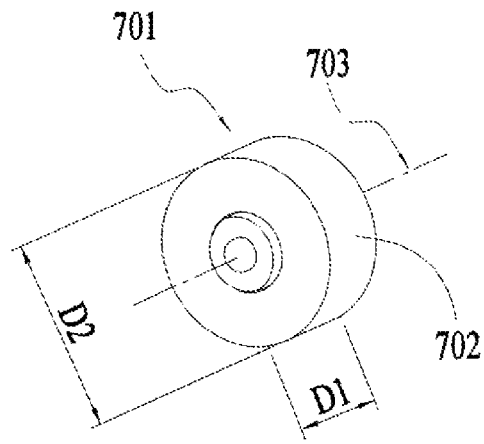
FIG. 19 is a perspective view of a shock absorber.

As shown in FIG. 19, each shock absorbing assembly is composed of the shock absorber 701, and the shock absorber 701 is made of an elastically deformable material. In this example, the shock absorber 701 may be a type of rubber pad. The shock absorber 701 is mounted in the power tool 100 along the direction of a mounting axis 703. In this example, the shock absorber 701 may be cylindrical or cubic. That is to say, the projection of the shock absorber 701 on a plane perpendicular to the mounting axis 703 may be circular, cylindrical, square, rectangular, or other shapes. In addition, the shock absorber 701 may also be configured to be a shock absorbing ring surrounding the outer side of the motor housing 340 as shown in the fourth shock absorbing assembly 740 in FIG. 17. The shape, surrounding manner, and arrangement manner of the shock absorber 701 are not limited.

The shock absorber 701 includes an outer surface 702. The thickness D1 of the shock absorber 701 may be configured to be 3 mm to 25 mm. In an example, the thickness D1 of the shock absorber 701 is 5 mm to 15 mm. The diameter D2 of the shock absorber 701 may be configured to be 10 mm to 40 mm. In an example, the diameter D2 of the shock absorber 701 may be configured to be 15 mm to 30 mm. In an example, the diameter D2 of the shock absorber 701 may be configured to be 15 mm to 25 mm.

Figure 20:
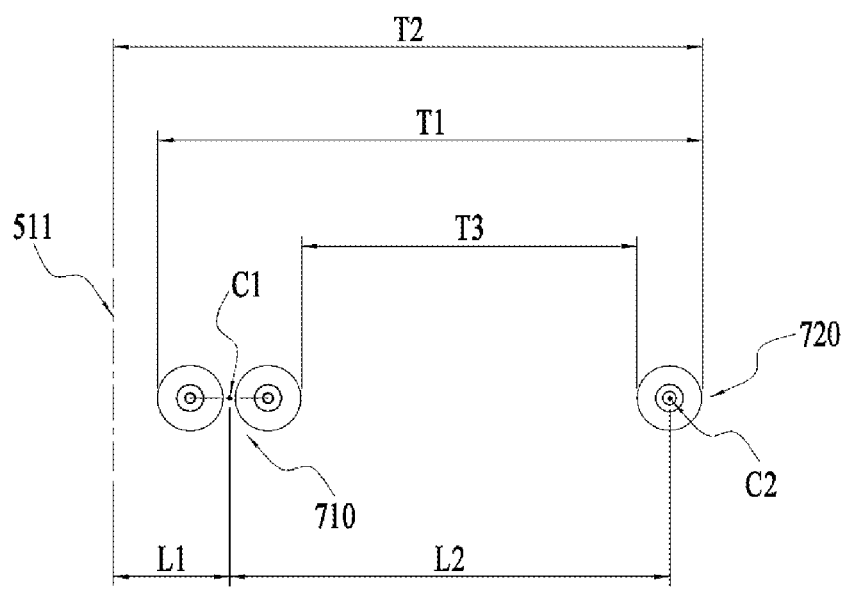
FIG. 20 is a schematic view illustrating the relative positions of a first shock absorbing assembly, a second shock absorbing assembly, and an output shaft axis in FIG. 17.

The shock absorbing mechanism 700 includes at least two shock absorbing assemblies, and each shock absorbing assembly includes at least one shock absorber 701. As shown in FIG. 20, the minimum distance between the first shock absorbing assembly 710 and the second shock absorbing assembly 720 is defined as a third length T3, where the third length T3 is greater than or equal to 30 mm. In an example, the third length T3 is greater than or equal to 60 mm. In an example, the third length T3 is greater than or equal to 70 mm. In an example, the third length T3 is greater than or equal to 80 mm. In some examples, the third length T3 may be set to 75 mm, 85 mm, 95 mm, 105 mm, 115 mm, or 125 mm. Two shock absorbing assemblies here can also be understood as two sets of shock absorbing assemblies.

Figure 18:
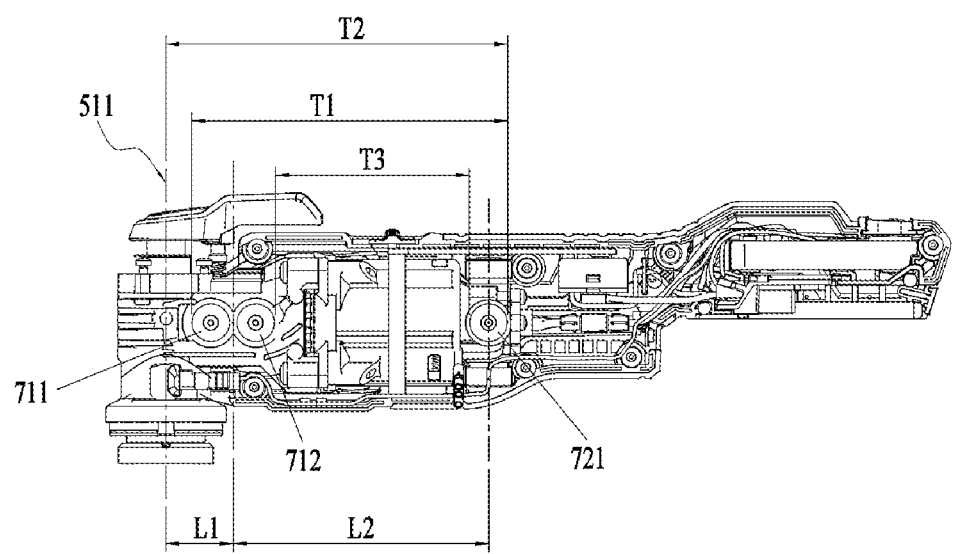
FIG. 18 is a side view of the structure shown in FIG. 17.

It is to be noted that the "shock absorbing assembly" mentioned in the present application includes at least one shock absorber 701, and the shock absorbing assembly may include only one shock absorber 701 or may be a combination of two or more shock absorbers 701. As shown in FIG. 18, to distinguish the first shock absorbing assembly 710 from the second shock absorbing assembly 720, the third length T3 between the first shock absorbing assembly 710 and the second shock absorbing assembly 720 is greater than or equal to 30 mm. That is to say, when two shock absorbers 701 are provided in the power tool 100, if the third length T3 between the two shock absorbers 701 is less than 30 mm, the two shock absorbers 701 are considered to be from the same shock absorbing assembly; if the third length T3 between the two shock absorbers 701 is greater than or equal to 30 mm, the two shock absorbers 701 are considered to be from two shock absorbing assemblies, such as the first shock absorbing assembly 710 and the second shock absorbing assembly 720. It is to be noted that the third length T3 refers to the minimum distance between the two shock absorbing assemblies 750 measured along the outer surface of the shock absorber 701, and the shock absorber 701 should be prevented from being deformed by pressure during measurement.

Figure 7:
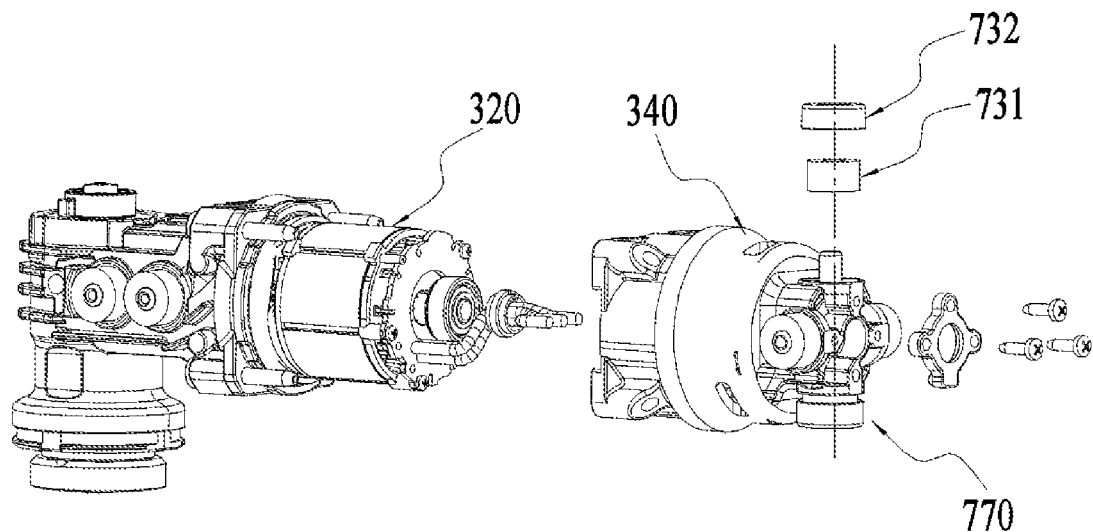
FIG. 7 is a partial exploded view of the power tool shown in FIG. 5.

In conjunction with FIGS. 17 and 7, the third shock absorbing assembly 730 includes a fourth shock absorber 731 and a positioning member 732, where the positioning member 732 is sleeved on the fourth shock absorber 731. The positioning member 732 may be used for limiting the position of the fourth shock absorber 731. The fourth shock absorber 731 and the positioning member 732 are made of different materials. In an example, the fourth shock absorber 731 and the positioning member 732 may be elastic members with different densities, thereby improving the damping and shock absorbing effect on a lead securing portion 341. In an example, the positioning member 732 is a rigid member.

As shown in FIG. 17, the fourth shock absorbing assembly 740 is made of a flexible element, specifically an annular sponge pad or an annular rubber pad. The fourth shock absorbing assembly 740 may be directly fixed on the outside of the motor housing 340, for example, glued to an outer circumference of the motor housing 340 or directly fixed on the inner wall of the housing.

In addition, on the right side of the motor shaft 330, a fifth shock absorbing assembly corresponding to the first shock absorbing assembly 710 is symmetrical about the first middle plane 101, and a sixth shock absorbing assembly corresponding to the second shock absorbing assembly 720 is symmetrical about the first middle plane 101. As shown in FIGS. 5 and 7, a seventh shock absorbing assembly 770 is further disposed below the motor shaft 330. The detailed description is not made here.

It is to be noted that in the shock absorbing assemblies described above, the mounting axes 703 of the shock absorbers 701 in the first shock absorbing assembly 710 and the second shock absorbing assembly 720 are basically parallel, so the first shock absorbing assembly 710 and the second shock absorbing assembly 720 are on the same latitude. The mounting axis 703 of the third shock absorbing assembly 730 is basically perpendicular to the mounting axis 703 of the first shock absorbing assembly 710, so the third shock absorbing assembly 730 and the first shock absorbing assembly 710 are on different latitudes. It is also to be understood that the first shock absorbing assembly 710 and the second shock absorbing assembly 720 are located on the left side of the motor shaft 330, the third shock absorbing assembly 730 is located on the upper side of the motor shaft 330, and the fourth shock absorbing assembly 740 surrounds the motor shaft 330 along the circumferential direction. This is called "different dimensions", and the multiple shock absorbing assemblies in different dimensions are used for separately damping forces in different directions.

With continued reference to FIG. 18, the maximum span formed by the first shock absorbing assembly 710 and the second shock absorbing assembly 720 in the front and rear direction is defined as a first length T1, where the first length T1 is greater than or equal to 110 mm. It is to be noted that the first length T1 refers to the maximum span formed by each shock absorber 701 in the first shock absorbing assembly 710 and the second shock absorbing assembly 720 along the front and rear direction. In this example, the front and rear direction is the direction of the motor axis 1301. In addition, the first length T1 needs to be measured along the outer surface of the shock absorber 701, and the shock absorber 701 should be prevented from being deformed by pressure during measurement.

In an example, the first length T1 is greater than or equal to 115 mm. In an example, the first length T1 is greater than or equal to 120 mm. In an example, the first length T1 is greater than or equal to 130 mm. In an example, the first length T1 is less than or equal to 160 mm. In an example, the first length T1 is less than or equal to 150 mm. In an example, the first length T1 is less than or equal to 145 mm. In some examples, the first length T1 is about 125 mm, 130 mm, 135 mm, or 140 mm.

It is to be noted that the above only limits the first length T1 between the first shock absorbing assembly 710 and the second shock absorbing assembly 720 and does not limit other shock absorbing assemblies. That is to say, the distance between the third shock absorbing assembly 730 and the first shock absorbing assembly 710 is not affected by the distance between the second shock absorbing assembly 720 and the first shock absorbing assembly 710, and the third shock absorbing assembly 730 may be basically located on the same vertical line with the second shock absorbing assembly 720 or keep a certain distance from the second shock absorbing assembly 720.

In addition, although in this example, the first shock absorbing assembly 710 and the second shock absorbing assembly 720 are basically arranged along the front and rear direction, in other examples, the first shock absorbing assembly 710 and the second shock absorbing assembly 720 may also be staggered up and down, that is, a certain height difference exists between the first shock absorbing assembly 710 and the second shock absorbing assembly 720 in the up and down direction. In this case, the mounting axes 703 of the shock absorbers 701 of the first shock absorbing assembly 710 and the second shock absorbing assembly 720 may not be in parallel, that is, form an included angle.

As shown in FIG. 20, the first shock absorbing assembly 710 has the first shock absorbing center C1, and the second shock absorbing assembly 720 has the second shock absorbing center C2. In this example, the first shock absorbing center C1 is the center of the line connecting the geometric centers of the first shock absorber 711 and the second shock absorber 712, and the second shock absorbing center C2 is the geometric center of the third shock absorber 721.

The distance between the first shock absorbing center C1 and the output shaft axis 511 is defined as a first distance L1, and the distance between the first shock absorbing center C1 and the second shock absorbing center C2 is defined as a second distance L2.

The first distance L1 is greater than or equal to 10 mm and less than or equal to 40 mm. In an example, the first distance L1 is greater than or equal to 15 mm and less than or equal to 35 mm. In an example, the first distance L1 is greater than or equal to 20 mm and less than or equal to 30 mm. The second distance L2 is greater than or equal to 60 mm and less than or equal to 130 mm. In an example, the second distance L2 is greater than or equal to 70 mm and less than or equal to 120 mm. In an example, the second distance L2 is greater than or equal to 80 mm and less than or equal to 120 mm. In an example, the second distance L2 is greater than or equal to 90 mm and less than or equal to 120 mm.

The ratio of the first distance L1 to the second distance L2 is less than or equal to 0.27. In an example, the ratio of the first distance L1 to the second distance L2 is less than or equal to 0.25. In an example, the ratio of the first distance L1 to the second distance L2 is less than or equal to 0.23. In an example, the ratio of the first distance L1 to the second distance L2 is greater than or equal to 0.18. In an example, the ratio of the first distance L1 to the second distance L2 is greater than or equal to 0.20. In an example, the first distance L1 is about 25 mm, the second distance L2 is about 105 mm, and the ratio of the first distance to the second distance is about 0.24. In an example, the first distance L1 is about 25 mm, the second distance L2 is about 113 mm, and the ratio of the first distance to the second distance is about 0.22. In an example, the first distance L1 is about 20 mm, the second distance L2 is about 120 mm, and the ratio of the first distance to the second distance is about 0.16.

Figure 27:
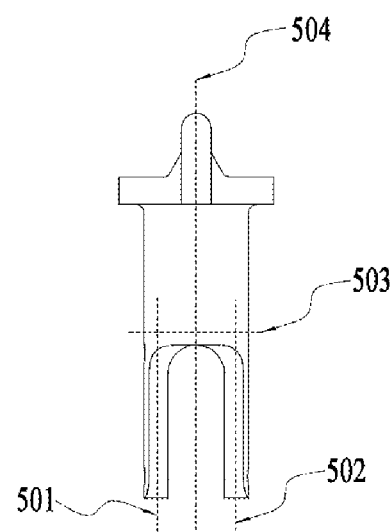
FIG. 27 is a side view of the first element in FIG. 26.

In more examples, referring to FIGS. 21A to 21E, the shock absorbing center C of a shock absorbing assembly 750 may have various forms. As shown in FIG. 27A, when the shock absorbing assembly 750 includes only one shock absorber 701, a first shock absorbing center C11 is the geometric center of the shock absorber 701. As shown in FIGS. 27B to 27D, when the shock absorbing assembly 750 includes only two shock absorbers 701, no matter whether the two shock absorbers 701 are arranged up and down or front and rear or arranged at an included angle with the motor axis 1301, the first shock absorbing center is the center of gravity of the line connecting the geometric centers of the two shock absorbers 701, such as a second shock absorbing center C12, a third shock absorbing center C13, and a fourth shock absorbing center C14. As shown in FIG. 27E, when the shock absorbing assembly 750 includes only three shock absorbers 701, a first shock absorbing center C13 is the center of the triangle formed by the lines connecting the geometric centers of the three shock absorbers 701. Specifically, the center of the triangle is mathematically defined as the point of intersection of three medians of the triangle. Further, in an example, if the shock absorbing assembly 750 includes only four shock absorbers 701, the first shock absorbing center is the center of the quadrilateral formed by the lines connecting the geometric centers of the four shock absorbers 701. The same goes for the case where the shock absorbing assembly 750 includes more shock absorbers 701.

Figure 21A:
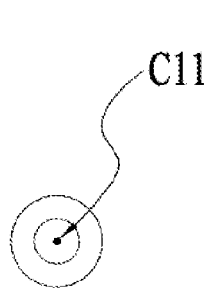
FIGS. 21A to 21E are various examples of a shock absorbing center of a shock absorbing assembly in FIG. 14.
Figure 21B:
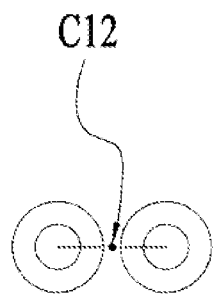
Figure 21C:
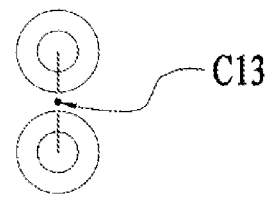
Figure 21D:
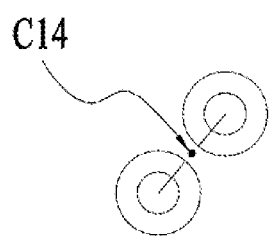
Figure 21E:
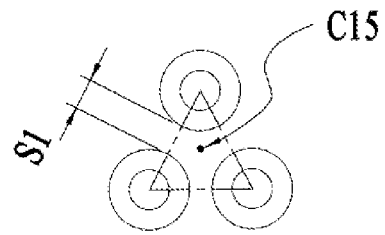

As shown in FIG. 21E, if the number of shock absorbers 701 included in the shock absorbing assembly 750 is greater than or equal to two, the minimum distance S1 between the outer surfaces 702 of any two shock absorbers 701 in the same shock absorbing assembly 750 is less than 30 mm. The minimum distance here refers to the distance between the outer surfaces 702 of two shock absorbers 701 in a natural state, that is, the distance between the outer surfaces 702 of the two shock absorbers 701 that are not compressed and elastically deformed. That is to say, when the number of shock absorbers included in the first shock absorbing assembly is greater than or equal to two, the minimum distance S1 between any two shock absorbers in the first shock absorbing assembly is less than 30 mm; when the number of shock absorbers included in the second shock absorbing assembly is greater than or equal to two, the minimum distance S1 between any two shock absorbers in the second shock absorbing assembly is also less than 30 mm.

In an example, the minimum distance S1 between the outer surfaces 702 of any two shock absorbers 701 in the same shock absorbing assembly 750 is less than 20 mm; in an example, the minimum distance S1 between the outer surfaces 702 of any two shock absorbers 701 in the same shock absorbing assembly 750 is less than 15 mm; in an example, the minimum distance S1 between the outer surfaces 702 of any two shock absorbers 701 in the same shock absorbing assembly 750 is less than 10 mm.

It is to be noted that any shock absorbing assembly 750 may include one or more shock absorbers 701 according to the manner in the preceding description, and the shock absorbing center C of the shock absorbing assembly 750 is also determined according to the preceding description. In an example, each of the first shock absorbing assembly 710 and the second shock absorbing assembly 720 may include two or more shock absorbers 701.

In addition, referring to FIGS. 17 and 20, in this example, in addition to the first shock absorbing assembly 710 and the second shock absorbing assembly 720, the power tool 100 further includes the third shock absorbing assembly 730 and the fourth shock absorbing assembly 740. The position of the projection of the second shock absorbing center C2 of the second shock absorbing assembly 720 on the motor axis 1301 basically coincides with the position of the projection of the third shock absorbing center of the third shock absorbing assembly 730 on the motor axis 1301. That is to say, along the front and rear direction of the power tool 100, the distance from the second shock absorbing center C2 to the output shaft axis 511 is basically equal to the distance from the third shock absorbing center to the output shaft axis 511.

The shock absorbing assembly farthest from the output shaft axis is defined as the farthest shock absorbing assembly, and the maximum distance from the farthest shock absorbing assembly to the output shaft axis is a second length T2, where the second length T2 is greater than or equal to 120 mm.

First, the shock absorbing assembly farthest from the output shaft axis 511 is determined. In this example, the farthest shock absorbing assembly farthest from the output shaft axis 511 is the second shock absorbing assembly 720. The second length T2 between the shock absorbing assembly farthest from the output shaft axis 511 and the output shaft axis 511 is greater than or equal to 120 mm. The farthest shock absorbing distance defined here refers to the distance from an outer edge 703 of the shock absorber 701 to the output shaft axis 511. In other examples, the second length T2 between any shock absorbing assembly 750 farthest from the output shaft axis 511 along the front and rear direction and the output shaft axis 511 is greater than or equal to 120 mm. In an example, the second length T2 between the farthest shock absorbing assembly 750 and the output shaft axis 511 is greater than or equal to 125 mm. In an example, the second length T2 between the farthest shock absorbing assembly 750 and the output shaft axis 511 is greater than or equal to 130 mm. In an example, the second length T2 between the farthest shock absorbing assembly 750 and the output shaft axis 511 is greater than or equal to 135 mm.

Figure 22:
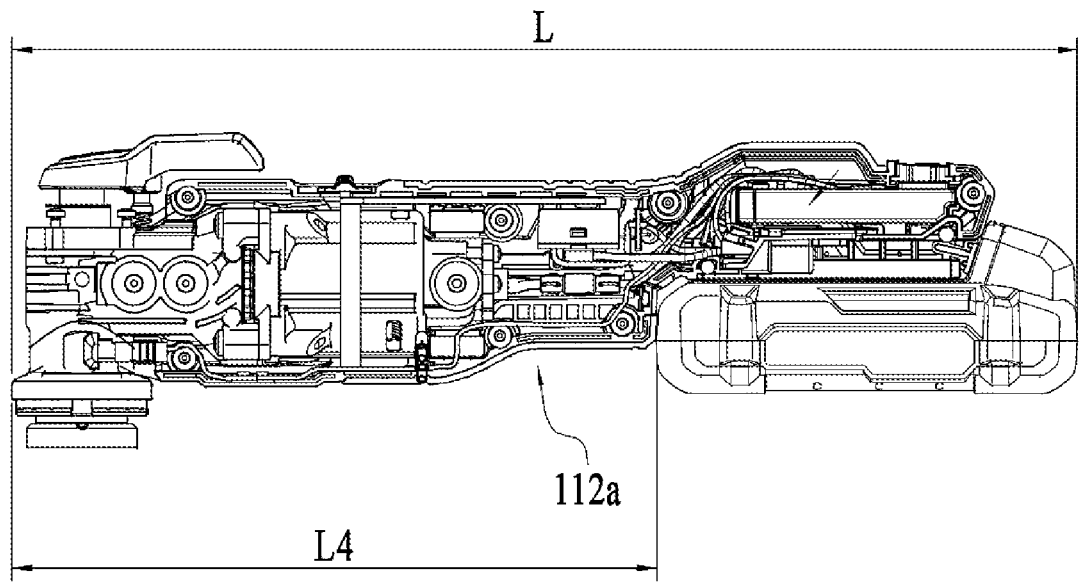
FIG. 22 is a side view of a whole machine of a power tool.

As shown in FIG. 22, the overall length L of the power tool 100 is the distance from the output mechanism 500 at the frontmost end of the power tool 100 to the rearmost side of the battery pack 800 at the rearmost end of the power tool 100. In an example, the overall length L is greater than or equal to 300 mm and less than or equal to 350 mm. In some examples, the overall length L is separately 320 mm, 330 mm, or 340 mm.

The ratio of the first length T1 between the first shock absorbing assembly 710 and the second shock absorbing assembly 720 to the overall length L is greater than or equal to 0.33. In an example, the ratio of the first length T1 to the overall length L is greater than or equal to 0.35. In an example, the ratio of the first length T1 to the overall length L is about 0.38.

A fourth distance L4 is defined as the minimum distance from the output mechanism 500 at the frontmost end of the power tool 100 to the battery pack 800. The ratio of the first length T1 between the first shock absorbing assembly 710 and the second shock absorbing assembly 720 to the fourth distance L4 is greater than or equal to 0.58. In an example, the ratio of the first length T1 to the fourth distance L4 is greater than or equal to 0.62. In an example, the ratio of the first length T1 to the fourth distance L4 is about 0.66.

It is to be noted that if the battery pack 800 is inserted into the battery pack coupling portion 801 in a direction oblique to the motor axis 1301, the intersection of the battery pack 800 and the motor axis 1301 is set as the "front side" of the battery pack 800, and the distance from the frontmost end of the power tool 100 (excluding the work attachments such as the blade and the saw blade) to the intersection of the battery pack 800 and the motor axis 1301 is the fourth distance L4.

Figure 23:
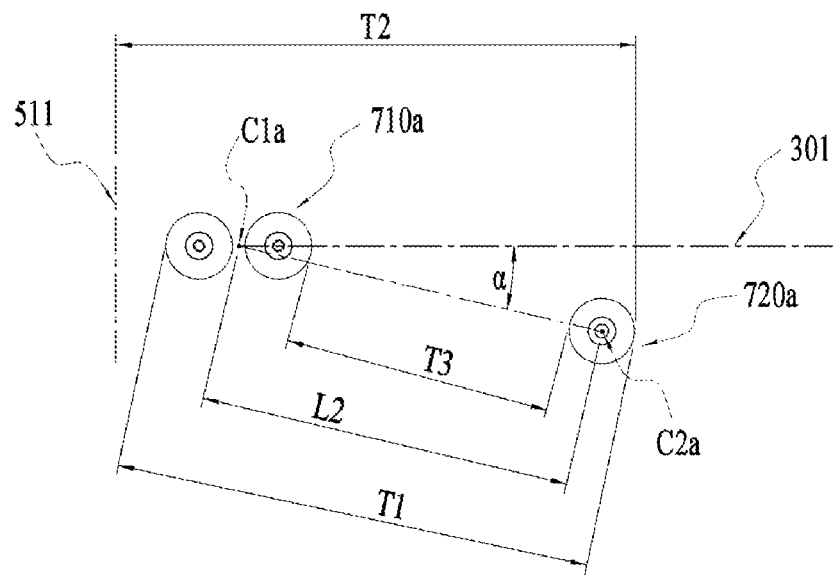
FIG. 23 is another example of a first shock absorbing assembly, a second shock absorbing assembly, and an output shaft axis in FIG. 14.

As shown in FIG. 23, in an example, a first shock absorbing center C1a of a first shock absorbing assembly 710a and a second shock absorbing center C2a of a second shock absorbing assembly 720a are not arranged along a straight line parallel to the motor axis 1301 in the front and rear direction. That is to say, the line connecting the first shock absorbing center C1a and the second shock absorbing center C2a forms a non-zero included angle α with the motor axis 1301. In this case, the first length T1, the third length T3, and the second distance L2 are all measured as shown in FIG. 23.

If two shock absorbers 701 in the same shock absorbing assembly 750 are disposed on the upper and lower sides of the motor axis 1301, first, the shock absorbing center of the shock absorbing assembly 750 is found according to the manner disclosed in FIGS. 21A to 21E; if the shock absorbing center is not on the motor axis 1301, the projection of the shock absorbing center on the motor axis 1301 is made.

Generally, the first shock absorbing assembly 710 includes one or two shock absorbers 701, and the second shock absorbing assembly 720 also includes one or two shock absorbers 701. Through creative work, calculation, and reasoning, the applicant found that if the number of shock absorbers 701 is not changed, the distance relationship between two shock absorbing assemblies is adjusted to significantly improve the shock absorbing effect and verified the preceding inventive discovery of the inventor through simulations and experiments. In the technical method disclosed in the present application, the position and distance relationship between the first shock absorbing assembly 710 and the second shock absorbing assembly 720 is limited so that the shock absorbing effect of the shock absorbing assembly 750 is better, and the vibration of the whole machine is smaller. In this manner, the operator is not easy to be fatigued when holding the whole machine for a long time, and the noise generated by vibration is also reduced.

Figure 24:
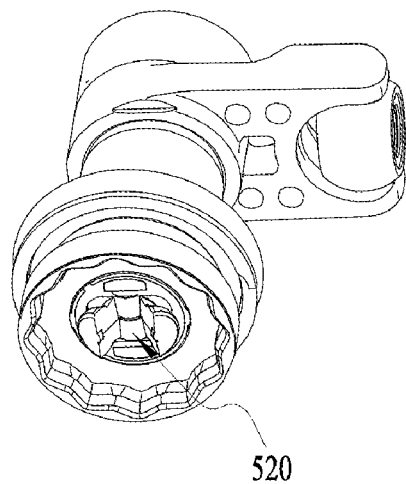
FIG. 24 is a perspective view of FIG. 11 from another perspective.
Figure 25:
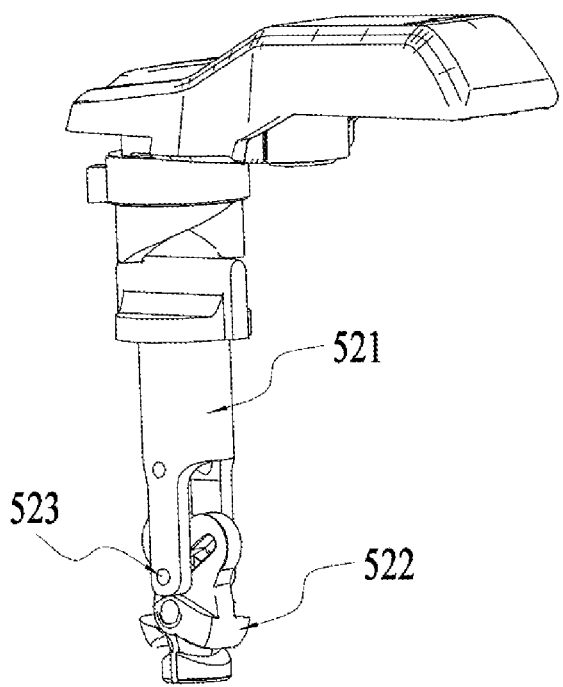
FIG. 25 is a perspective view of a mounting assembly.
Figure 26:
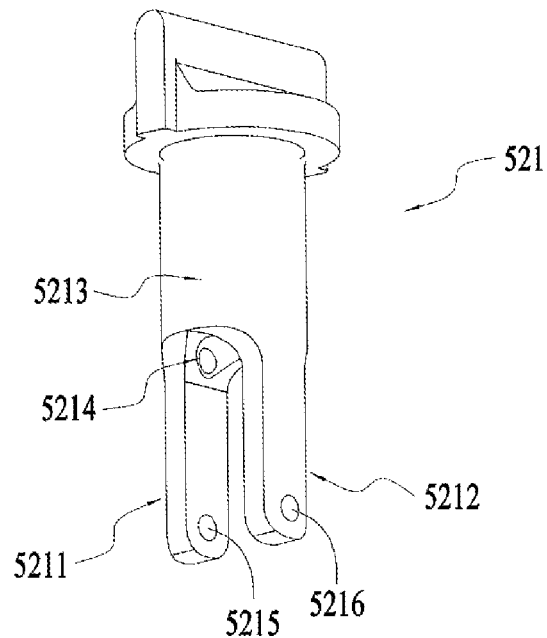
FIG. 26 is a perspective view of a first element.

FIGS. 24 to 26 disclose the mounting assembly 520 by which various work attachments 200 may be mounted to the power tool 100. The mounting assembly 520 includes a first element 521 and a clamping piece 522. A connecting pin 523 connects the first element 521 to two clamping pieces 522. The up-and-down movement of the first element 521 drives the clamping piece 522 to be opened and closed.

As shown in FIG. 26, the first element 521 includes a first protruding portion 5211, a second protruding portion 5212, and a connecting portion 5213, where the first protruding portion 5211 extends along a first straight line 501, the second protruding portion 5212 extends along a second straight line 502, and the first straight line 501 is basically parallel to the second straight line 502. The connecting portion 5213 connects the first protruding portion 5211 to the second protruding portion 5212 along a direction of a third straight line 503, and the third straight line 503 is perpendicular to the first straight line 501 and the second straight line 502. The first protruding portion 5211, the second protruding portion 5212, and the connecting portion 5213 form a U shape.

A second middle plane 504 is provided along the geometric center of the connecting portion 5213 and perpendicular to the connecting portion 5213, the first protruding portion 5211 and the second protruding portion 5212 are separately located on two sides of the second middle plane 504, and the first protruding portion 5211 and the second protruding portion 5212 are not completely symmetrical about the middle plane. In this example, the first protruding portion 5211 has a first connecting hole 5215, and the second protruding portion 5212 has a second connecting hole 5216. The first protruding portion 5211 has an opening 5214, and the second protruding portion 5212 has no opening at a position symmetrical to the opening 5214. It is to be noted that the opening 5214 here is not used for connecting any component.

The structure and material of the first element 521 are similar to those of a "tuning fork". The tuning fork is a musical instrument. Here is a brief explanation of the tuning fork: the tuning fork is made of elastic metal, is a two-pronged fork with a handle at the end, and is shaped like the Latin letter U. The tuning fork has a constant resonant frequency and vibrates when being struck. After the initial overtone series fades out, the sound from the tuning fork has a constant pitch.

Since an end of the first element 521 forms a U-shaped structure, that is, a "tuning fork" structure, to avoid the noise caused by the vibration of the first element 521, the opening 5214 is used for breaking the original "tuning fork" structure so that the first protruding portion 5211 and the second protruding portion 5212 are not symmetrical about the second middle plane 504, so as to avoid the noise caused by the formation of the "tuning fork" structure. In some examples, in addition to punching a hole, rids may be provided on the first protruding portion 5211 and/or the second protruding portion 5212 so that the first protruding portion 5211 is not symmetrical to the second protruding portion 5212.

In addition, a U-shaped structure is also formed on a side of the oscillating member 420. If the oscillating member 420 is configured to be an asymmetric structure, the noise when the oscillating member 420 oscillates can also be reduced.

Figure 28:
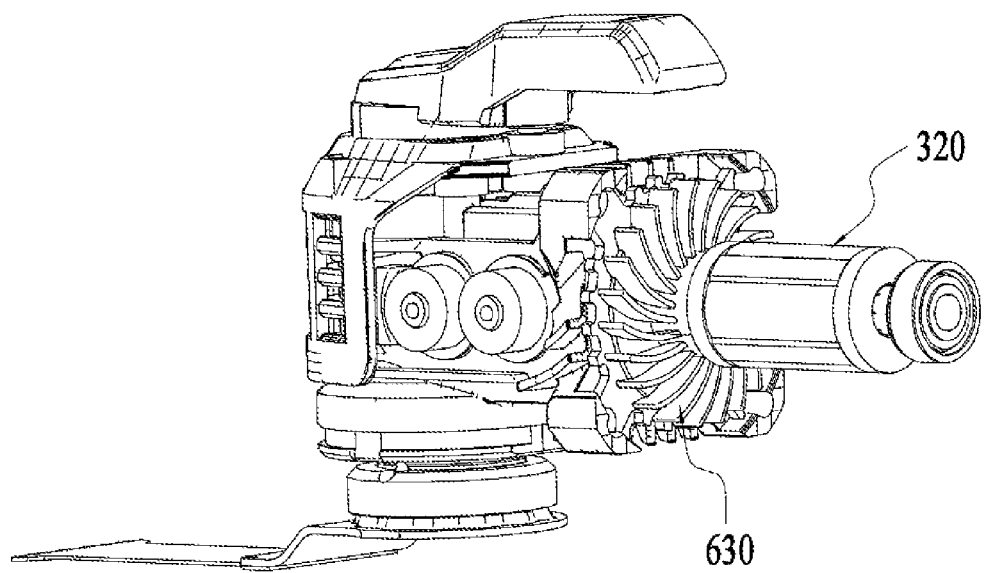
FIG. 28 is a perspective view of part of the structure of a power tool.

The heat dissipation mechanism 600 is described below. In conjunction with FIGS. 8 and 28, the fan 630 is disposed on a side of the motor 320 and driven by the motor shaft 330 to rotate.

Figure 29:
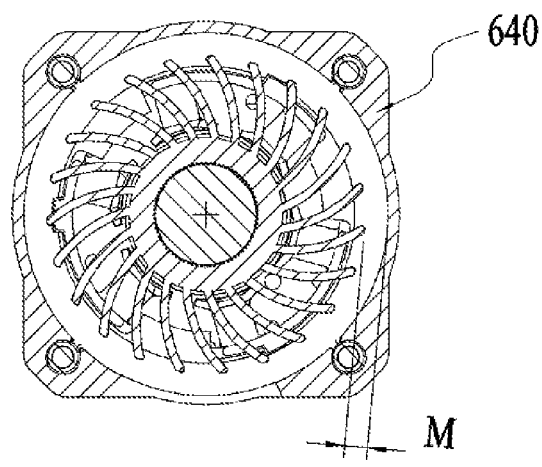
FIG. 29 is a sectional view of a heat dissipation mechanism.

As shown in FIG. 29, the heat dissipation mechanism 600 further includes an air guide hood 640, and the minimum distance M between the fan 630 and the air guide hood 640 along a radial direction perpendicular to the motor axis 1301 is greater than or equal to 2 mm and less than or equal to 4 mm.

Figure 30:
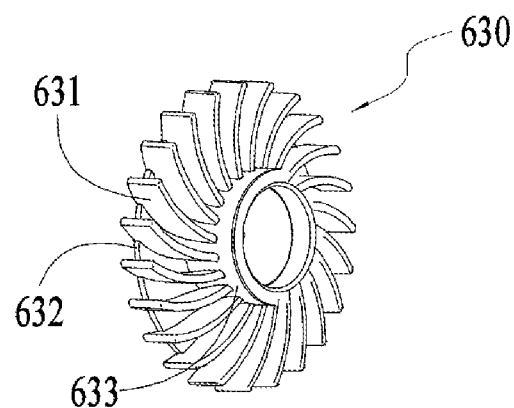
FIG. 30 is a perspective view of a fan.
Figure 31:
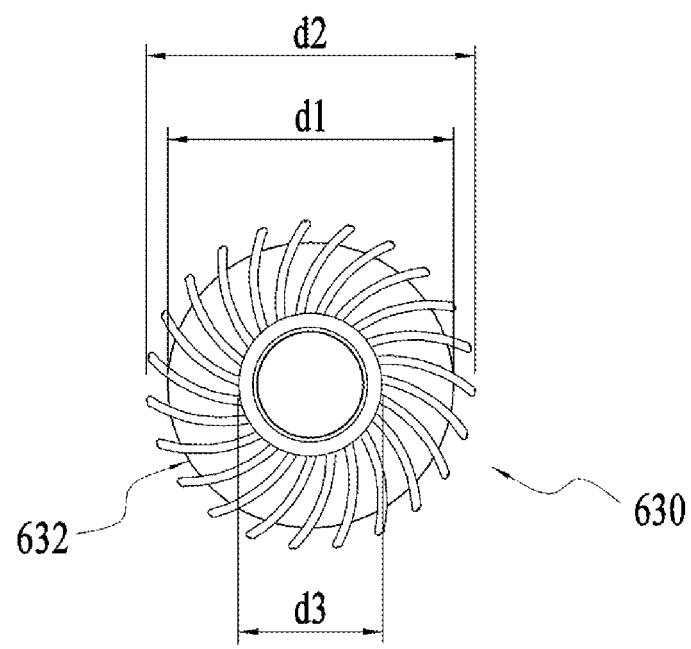
FIG. 31 is a rear view of the fan in FIG. 30 viewed along the rear side of a power tool.
Figure 32:
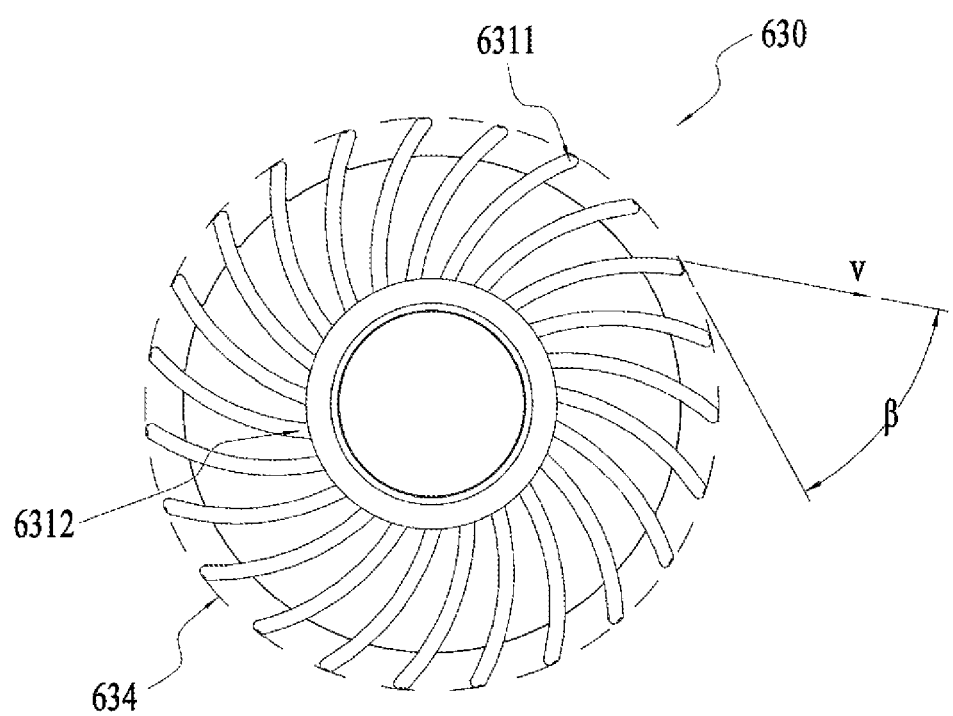
FIG. 32 is another rear view of the fan in FIG. 30 viewed along the rear side of a power tool.

As shown in FIGS. 30 to 32, the fan 630 is a centrifugal fan, and alternating current is used as an energy source of the oscillating power tool involved in the present application. The fan 630 includes arc-shaped fan blades 631, a base plate 632, and a support portion 633. The fan blades 631 are partially integrated into the base plate 632 and partially exposed from the base plate 632. The fan blade includes a root 6312 and a tail 6311. The root 6312 of the fan 631 is connected to the support portion 633. The middle opening of the support portion 633 is used for the motor shaft 330 to penetrate through. The airflow flows out along the tail 6311 of the fan blade 631. A circle formed by connecting tails 6311 of multiple fan blades 631 is defined as an outer circle 634. It is to be noted that the outer circle 634 here is not an actual component, but an auxiliary line drawn by the fan blades 631.

The diameter of the base plate 632 is a first diameter d1, and the diameter of the outer circle 634 is a second diameter d2. The ratio of the second diameter d2 to the first diameter d1 is greater than or equal to 1.05 and less than or equal to 1.18.

When the motor 320 is an inner rotor motor, the ratio of the second diameter d2 of the outer circle 634 to the outer diameter of the inner rotor motor is greater than or equal to 0.8 and less than or equal to 1.2.

The diameter of the support portion 633 of the fan 630 is a third diameter d3. When the motor 320 is an inner rotor motor, the ratio of the third diameter d3 to the rotor diameter is greater than or equal to 0.5 and less than or equal to 1.5.

As shown in FIG. 32, the airflow flows out along the tail 6311 of the fan blade 631 at a speed v, and the included angle β between the tangent to the outer circle 634 at the tail 6311 of the fan blade 631 and the speed v at which the airflow flows out from the tail 6311 is greater than or equal to 35 degrees and less than or equal to 60 degrees.

In the existing art, the fan blade 631 is generally configured to be linear. Through creative work, calculation, and reasoning, the applicant found that the arc-shaped fan blades have a better noise reduction effect than the linear fan blades and verified the preceding inventive discovery of the inventor through simulations and experiments The arc-shaped fan blades 631 are conducive to reducing the noise generated by the fan 630 during rotation. Further, the specific structural feature such as the distance at which the tail 6311 of the fan blade 631 protrudes from the base plate 632 is adjusted, and the minimum distance between the fan 630 and the air guide hood 640 is limited so that the noise generated when the fan 630 rotates to generate the airflow is effectively reduced, the noise reduction and the heat dissipation capacity of the fan 630 are balanced, and the following is avoided: while the noise of the fan 630 is reduced, the mass flow rate of the fan 630 is reduced and the heat dissipation effect of the fan 630 is reduced.

In the present application, the maximum rotational speed of the motor 320 is greater than or equal to 19000 RPM and less than or equal to 21000 RPM, and the maximum oscillation angle of the work attachment 200 is greater than or equal to 1.9 degrees and less than or equal to 2.3 degrees. In an example, for the hand-held oscillating power tool, such as the oscillating multifunctional tool, the maximum rotational speed of the motor 320 is about 20000 RPM, and the maximum oscillation angle of the attachment 200 is 2.1 degrees. The oscillation angle here refers to the angle at which the output shaft 510 is driven by the oscillating member 420 to oscillate. The power tool 100 is improved in the preceding multiple aspects so that the vibration and noise of the whole machine of the power tool 100 are significantly improved, and the noise value of the power tool 100 in a load-free state can be as low as 77 decibels. Such a noise value has a huge advantage for the oscillating power tool and greatly optimizes the user experience.

FIGS. 33 to 41 provide an oscillating power tool. The oscillating power tool has a detachable work attachment 1400 and can drive the work attachment 1400 to oscillate left and right in a plane, so as to cut and machine the processing materials.

As shown in FIGS. 33 to 40, the oscillating power tool includes the housing 110, a clamping mechanism 1300, a power mechanism 1200, and the work attachment 1400. The housing 110 is the main mounting component of the oscillating power tool, and a cavity for mounting the clamping mechanism 1300 and the power mechanism 1200 is formed inside the housing 110. The power mechanism 1200 is used for outputting the oscillation motion, and the oscillation motion is transmitted through the clamping mechanism 1300 so that the work attachment 1400 oscillates in a certain plane. Part of the structure of the clamping mechanism 1300 is mounted in the housing 110. The clamping mechanism 1300 includes a first bearing 304, a support sleeve 303, an output shaft sleeve 302, and a locking rod 1301, where the first bearing 304 is sleeved on the support sleeve 303, the support sleeve 303 is sleeved on the output shaft sleeve 302, and the output shaft sleeve 302 is sleeved on the locking rod 1301. The first bearing 304 is fixed in the housing 110, the support sleeve 303 penetrates through the first bearing 304, the output shaft sleeve 302 is disposed in the support sleeve 303, and the output shaft sleeve 302 is rotatably sleeved outside the locking rod 1301. The locking rod 1301 can move along a first straight line b, a clamping space whose size is adjustable is formed between the first end of the locking rod 1301 and the first end of the output shaft sleeve 302, the output shaft sleeve 302 is drivingly connected to the power mechanism 1200, the second end of the output shaft sleeve 302 extends into the support sleeve 303 and is connected to the support sleeve 303, and the second end of the locking rod 1301 extends into the support sleeve 303. The work attachment 1400 is detachably connected in the clamping space, and the work attachment 1400 can be driven by the power mechanism 1200 to oscillate along with the output shaft sleeve 302.

It is to be noted that, in some examples, when the oscillating power tool is in the working state, the first straight line b is a vertical line. In this case, the first end of the locking rod 1301 and the first end of the output shaft sleeve 302 are both bottom ends, and the second end of the locking rod 1301 and the second end of the output shaft sleeve 302 are both top ends.

Compared with the oscillating power tool in the existing art, the overall structure of the clamping mechanism 1300 of the oscillating power tool provided in the present application is simple, and fewer components are used, so the manufacturing cost is lower. Moreover, since the output shaft sleeve 302 that drives the work attachment 1400 to rotate and the locking rod 1301 used for forming the clamping space and changing the size of the clamping space are supported and limited by the first bearing 304 and the support sleeve 303, the stability of the clamping mechanism 1300 in the housing 110 is relatively high, the vibration generated by the clamping mechanism 1300 in the working process is relatively small, and the user experience is relatively high.

Figure 33:
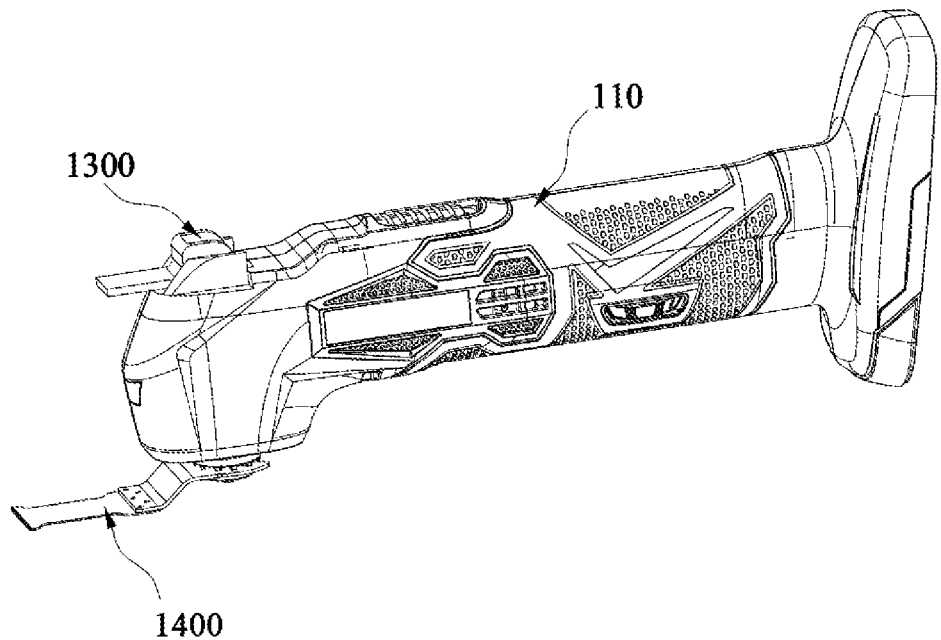
FIG. 33 is a schematic view of an oscillating power tool according to an example of the present application.
Figure 34:
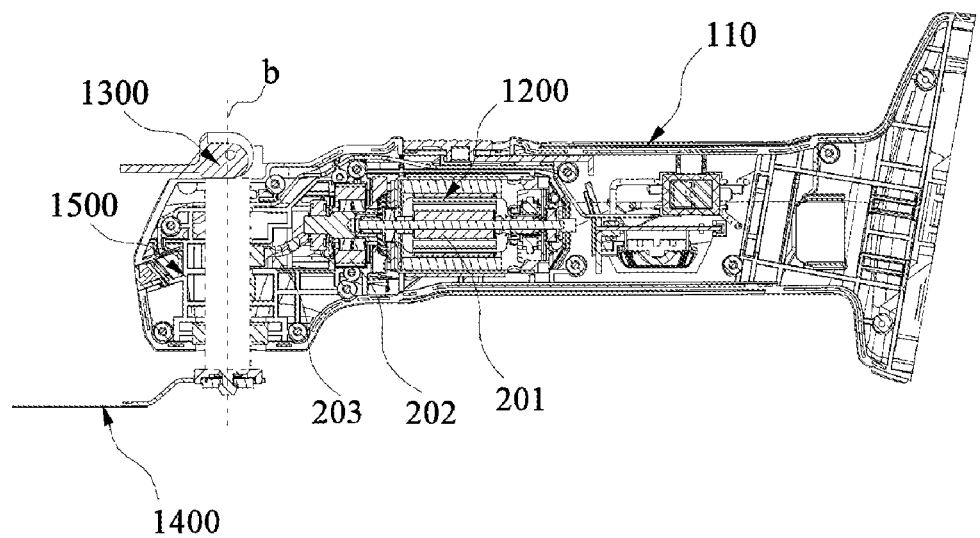
FIG. 34 is a sectional view of an oscillating power tool according to an example of the present application.

As shown in FIGS. 33 and 34, the overall housing 110 is cylindrical, the rear end of the housing 110 forms a grip, and the user may hold the grip to operate the oscillating power tool. Optionally, an anti-slip pattern is provided on the grip. The front end of the housing 110 forms a mounting portion, and the clamping mechanism 1300 vertically penetrates the mounting portion. Both the bottom end of the locking rod 1301 and the bottom end of the output shaft sleeve 302 protrude from the bottom of the mounting portion so that the work attachment 1400 can be detachably connected in the clamping space formed by the locking rod 1301 and the output shaft sleeve 302. When the cutting operation is required, the work attachment 1400 is mounted at the bottom of the clamping mechanism 1300. After the cutting operation is completed, the work attachment 1400 may be disassembled from the clamping mechanism 1300 for storage.

Figure 35:
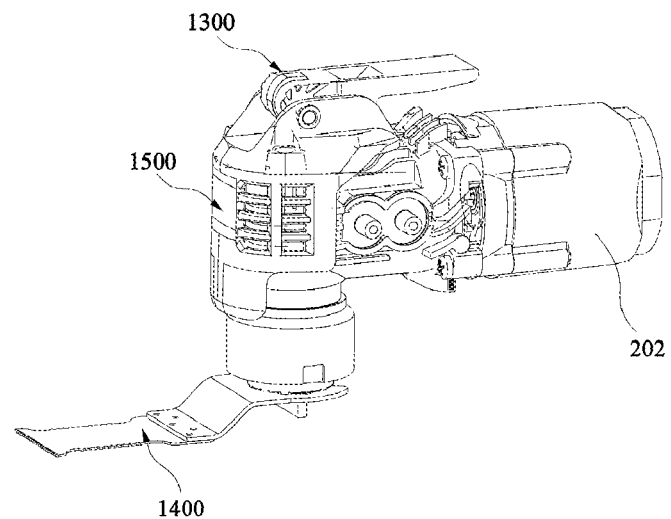
FIG. 35 is a schematic view of part of the structure of an oscillating power tool according to an example of the present application.
Figure 36:
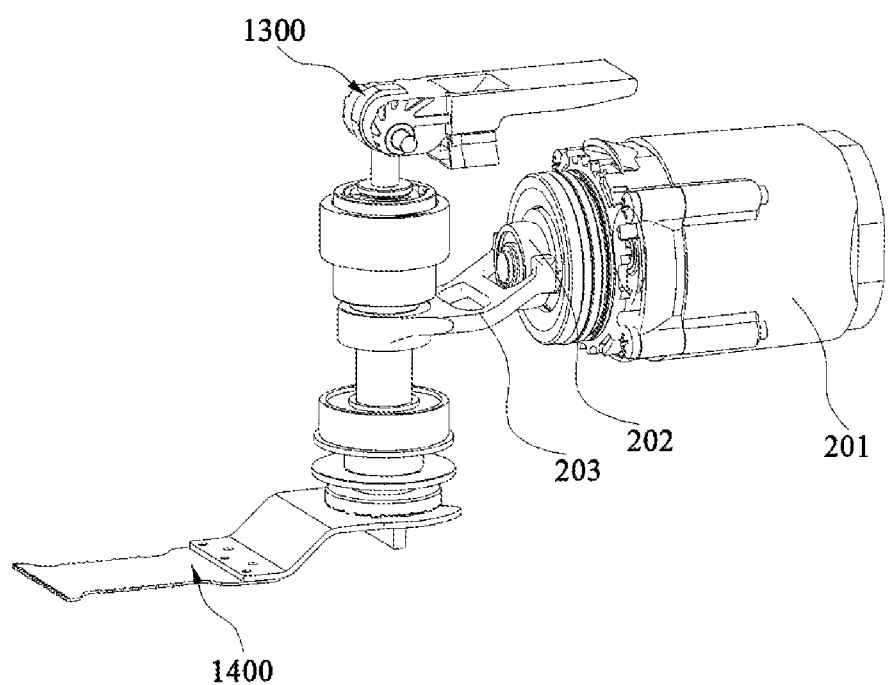
FIG. 36 is a sectional view of the structure shown in FIG. 35.
Figure 37:
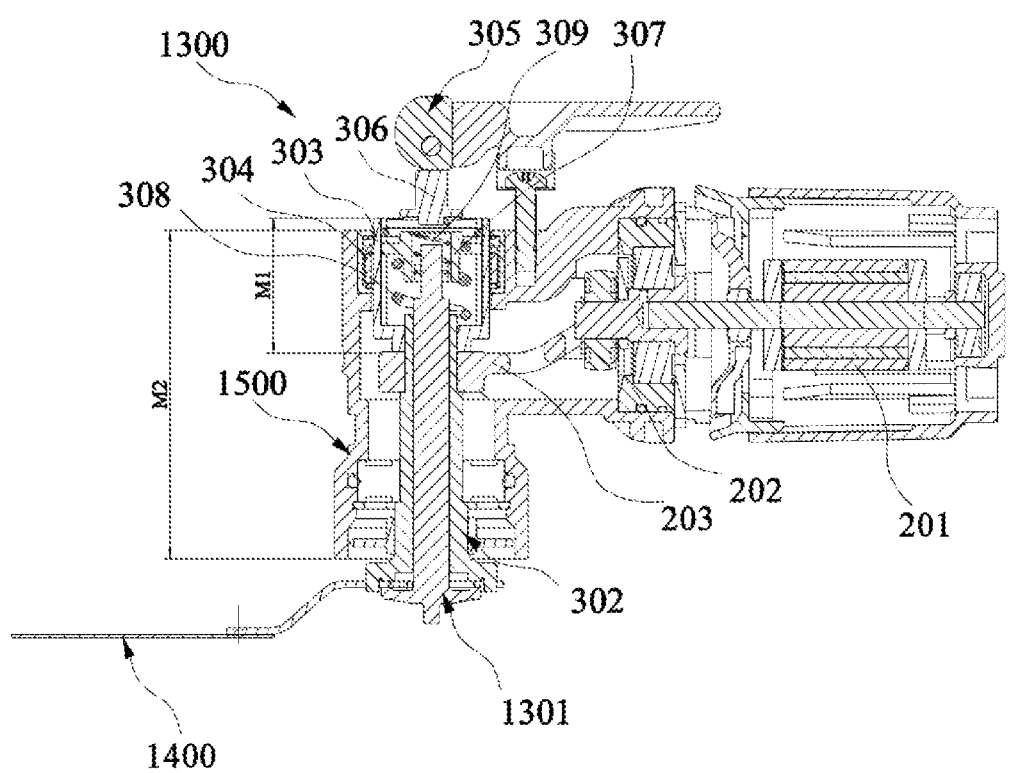
FIG. 37 is a schematic view of a power mechanism, a clamping mechanism, and a work attachment of an oscillating power tool according to an example of the present application.

As shown in FIGS. 34 to 36, the power mechanism 1200 is disposed in the grip of the housing 110. After the clamping mechanism 1300 clamps the work attachment 1400, the power mechanism 1200 works to drive the work attachment 1400 to oscillate in a plane perpendicular to the first straight line b. In this example, the plane is a horizontal plane. With continued reference to FIGS. 34 and 36, the power mechanism 1200 includes an electric motor 201, a ball sleeve 202, and an oscillating member 203, where the electric motor 201 is horizontally disposed inside the housing 110, the motor shaft of the electric motor 201 is horizontally disposed, the axis of the motor shaft of the electric motor 201 is the second straight line, the ball sleeve 202 is connected to the motor shaft of the electric motor 201, and the eccentricity of the ball sleeve 202 is determined according to the oscillation angle that the work attachment 1400 needs to achieve and is not limited here. In some examples, the ball sleeve 202 is an eccentric bearing. In some examples, the oscillating member 203 is a type of shift fork.

To achieve the connection between the ball sleeve 202 and the output shaft sleeve 302, the power mechanism 1200 further includes the oscillating member 203, where the oscillating member 203 is connected between the ball sleeve 202 and the clamping mechanism 1300 so that the rotation of the ball sleeve 202 is converted into the oscillation of the work attachment 1400 in the horizontal plane. Specifically, in this example, a clamping portion is disposed at an end of the oscillating member 203, and a first clamping groove is disposed on the clamping portion. Optionally, the first clamping groove is a U-shaped groove, the opening direction of the U-shaped groove is horizontal, and the ball sleeve 202 is disposed in the first clamping groove and can rotate freely in the first clamping groove. The other end of the oscillating member 203 is connected to the output shaft sleeve 302. Optionally, a sleeve hole is provided at the other end of the oscillating member 203, and the output shaft sleeve 302 is located in the sleeve hole, where the output shaft sleeve 302 has an interference fit with the oscillating member 203 or the output shaft sleeve 302 is fixedly connected to the oscillating member 203, so as to achieve synchronous movement.

When the ball sleeve 202 is driven by the electric motor 201 to rotate around the motor shaft of the electric motor 201, the contact point of the ball sleeve 202 and the clamping portion of the oscillating member 203 moves left and right in the horizontal plane, and the other end of the oscillating member 203 oscillates accordingly. When the oscillating member 203 is driven by the ball sleeve 202 to oscillate in the horizontal plane, the output shaft sleeve 302 can oscillate in the horizontal plane.

Figure 38:
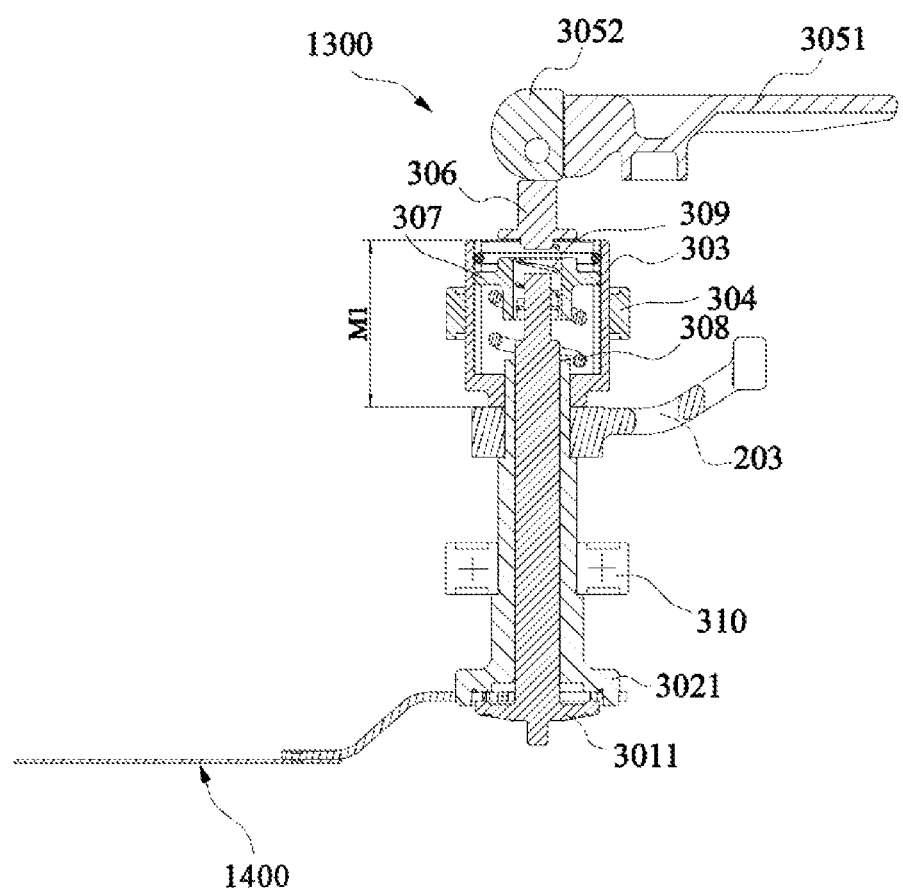
FIG. 38 is a sectional view of the structure shown in FIG. 37 when the work attachment is in a locked state.
Figure 39:
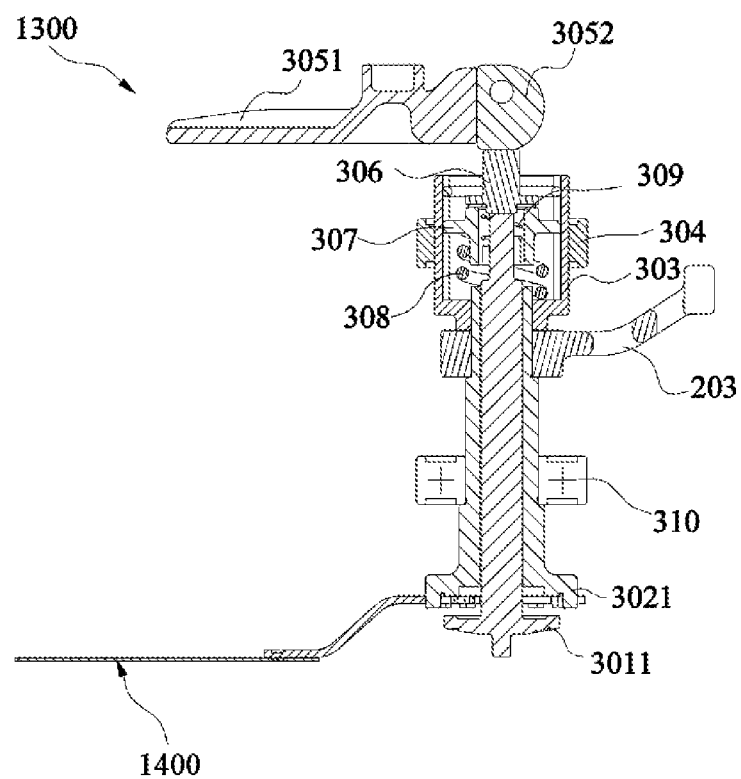
FIG. 39 is a sectional view of the structure shown in FIG. 37 when the work attachment is to be disassembled.

To form a relatively large clamping space, as shown in FIGS. 38 and 39, a first clamping portion 3011 is disposed at the bottom end of the locking rod 1301, a second clamping portion 3021 is disposed at the bottom end of the output shaft sleeve 302, and a clamping space is formed between the first clamping portion 3011 and the second clamping portion 3021. Optionally, the first clamping portion 3011 is a disk structure vertically disposed at the bottom end of the locking rod 1301, the second clamping portion 3021 is a disk structure vertically disposed at the bottom of the output shaft sleeve 302, and an annular clamping space is formed between the first clamping portion 3011 and the second clamping portion 3021.

When the locking rod 1301 moves downward, the first clamping portion 3011 moves downward synchronously, and since the height of the output shaft sleeve 302 and the second clamping portion 3021 above the output shaft sleeve 302 in the vertical direction remains unchanged, the width of the clamping space between the first clamping portion 3011 and the second clamping portion 3021 gradually increases as shown in the state in FIG. 39. At this time, the connection end of the work attachment 1400 may be disposed in the clamping space. When the locking rod 1301 moves upward, the first clamping portion 3011 moves upward synchronously, and the width of the clamping space between the first clamping portion 3011 and the second clamping portion 3021 gradually decreases, thereby clamping the work attachment 1400 in the clamping space as shown in the state in FIG. 38.

Figure 40:
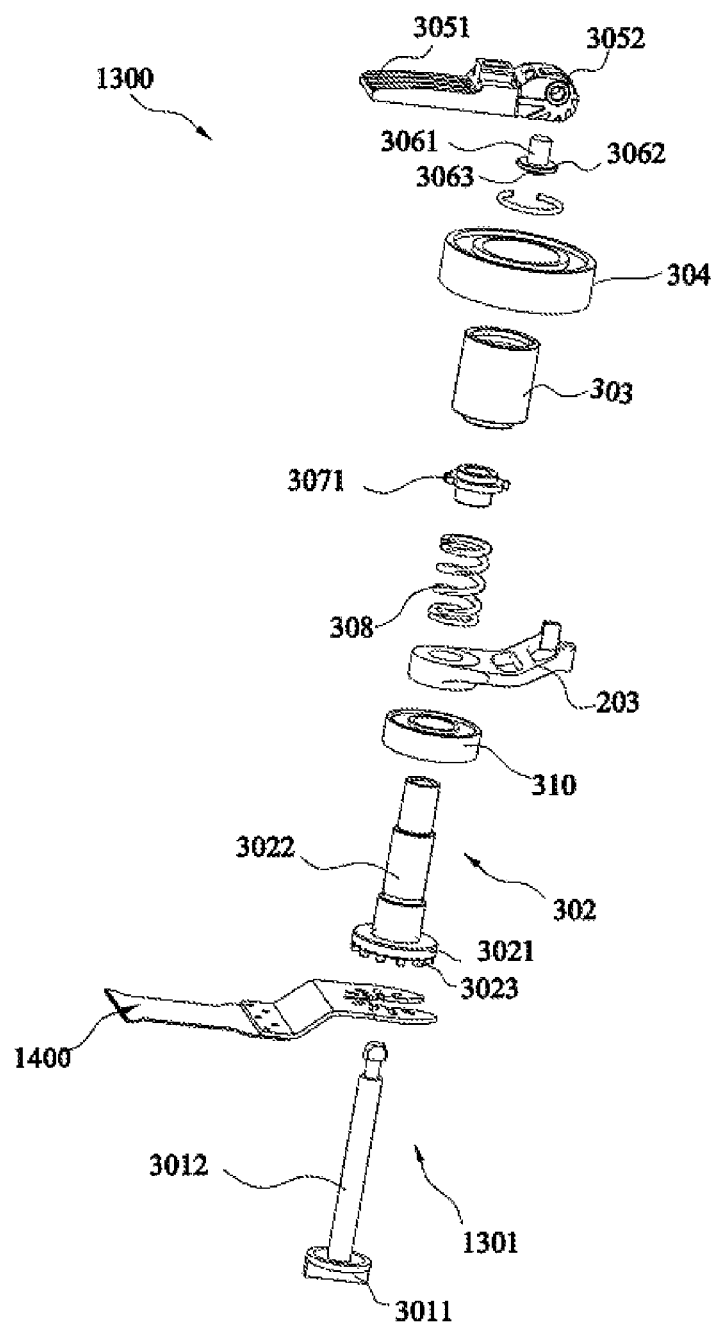
FIG. 40 is an exploded view of a power mechanism, a clamping mechanism, and a work attachment of an oscillating power tool according to an example of the present application.
Figure 41:
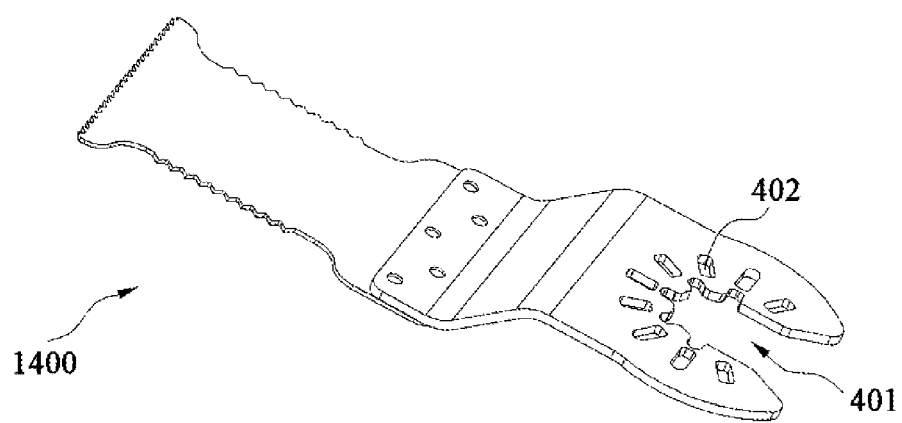
FIG. 41 is a schematic view of a work attachment according to an example of the present application.

In some examples, as shown in FIG. 40, limiting teeth 3023 are provided on the clamping surface of the first clamping portion 3011, limiting holes 402 are provided on the work attachment 1400, and the limiting teeth 3023 can engage with the limiting holes 402 so that when the output shaft sleeve 302 is driven by the oscillating member 203 to rotate, the work attachment 1400 rotates synchronously.

Optionally, in some examples, the limiting teeth 3023, the first clamping portion 3011, and the output shaft sleeve 302 are integrally formed so that no additional connection structure is needed to achieve the connection between the limiting teeth 3023, the first clamping portion 3011, and the output shaft sleeve 302, thereby greatly improving the structural compactness and strength and reducing the overall dimension and connection costs.

Further, multiple limiting teeth 3023 are provided on the first clamping portion 3011, the multiple limiting teeth 3023 are arranged radially on the first clamping portion 3011, multiple limiting holes 402 are provided on the work attachment 1400, and the multiple limiting holes 402 are arranged radially on the work attachment 1400 and disposed in one-to-one correspondence with the multiple limiting teeth 3023, thereby improving the limiting effect. In other examples, the positions of the limiting teeth 3023 and the limiting holes 402 may be interchanged, that is, the limiting teeth 3023 are provided on the work attachment 1400, and the limiting holes 402 are provided on the first clamping portion 3011.

With continued reference to FIG. 40, the locking rod 1301 further includes a locking rod body 3012, and the first clamping portion 3011 is disposed at the bottom end of the locking rod body 3012. In some examples, an annular clamping groove is provided at the bottom end of the locking rod body 3012, and the first clamping portion 3011 is mounted in the annular clamping groove so that the first clamping portion 3011 is detachably connected to the locking rod body 3012. In some examples, the locking rod body 3012 and the first clamping portion 3011 are integrally formed so that no additional connection structure is needed to achieve the connection between the locking rod body 3012 and the first clamping portion 3011, thereby greatly improving the structural compactness and strength and reducing the overall dimension and connection costs.

With continued reference to FIG. 40, the output shaft sleeve 302 further includes a sleeve body 3022, and the second clamping portion 3021 is connected to the bottom of the sleeve body 3022. In some examples, the sleeve body 3022 and the second clamping portion 3021 are integrally formed so that no additional connection structure is needed to achieve the connection between the sleeve body 3022 and the second clamping portion 3021, thereby greatly improving the structural compactness and strength and reducing the overall dimension and connection costs.

With continued reference to FIGS. 38 to 40, the clamping mechanism 1300 further includes a second bearing 310, the second bearing 310 is disposed in the housing 110, the length of the output shaft sleeve 302 is less than the length of the locking rod 1301, the output shaft sleeve 302 is rotatably disposed inside the housing 110 and sleeved on the middle and lower part of the locking rod 1301, and the output shaft sleeve 302 penetrates through the second bearing 310 so that the output shaft sleeve 302 can rotate inside the housing 110.

To allow the user to easily adjust the size of the clamping space and ensure that the adjustment process has high stability, as shown in FIGS. 38 to 40, the clamping mechanism 1300 further includes an operating member 305, a pressing rod 306, and a pressing block 307. The operating member 305 is rotatably connected outside the housing 110, the pressing rod 306 is movably disposed on the housing 110, the top end of the pressing rod 306 abuts against a cam portion 3052 of the operating member 305, the pressing block 307 is movably disposed in the support sleeve 303, a through hole penetrates through the pressing block 307, and the second end of the locking rod 1301 is disposed in the through hole and faces the bottom end of the pressing rod 306.

When the operating member 305 is driven by an external force to rotate around the third straight line, the operating member 305 can drive the pressing rod 306 to move vertically downward until the pressing rod 306 abuts against the pressing block 307, the operating member 305 continues rotating, the pressing rod 306 and the pressing block 307 moves downward synchronously, the top end of the locking rod 1301 gradually exposes the pressing block 307, and the pressing rod 306 can abut against the top end of the locking rod 1301. At this time, the operating member 305 continues rotating, and the pressing rod 306, the pressing block 307, and the locking rod 1301 move downward synchronously so that the bottom end of the pressing rod 306 protrudes from the bottom end of the output shaft sleeve 302, thereby increasing the clamping space.

It is to be noted that, in some examples, when the oscillating power tool is in the working state, the third straight line and the second straight line are both horizontal lines, the third straight line may be parallel to, perpendicular to, or at any included angle with the second straight line, and the third straight line is perpendicular to the first straight line b.

In some examples, the operating member 305 includes the cam portion 3052 and a handle portion 3051, where the cam portion 3052 is in an "ellipse-like" shape, the bottom surface of the cam portion 3052 abuts against the top end of the pressing rod 306, the handle portion 3051 is in the shape of a strip, and the user may apply torque to the handle portion 3051 to drive the cam portion 3052 to rotate around a rotating shaft. When the operating member 305 rotates around the rotating shaft, the height of the bottom surface of the cam portion 3052 changes so that the pressing rod 306 abutting against the cam portion 3052 can move vertically.

In some examples, the pressing rod 306 includes a first rod portion 3061, an abutting portion 3062, and a second rod portion 3063 connected in sequence, where the dimension of the abutting portion 3062 is greater than the dimension of the second rod portion 3063, the first rod portion 3061 abuts against the cam portion 3052, the second rod portion 3063 extends into the through hole and abuts against the locking rod 1301, and the lower end surface of the abutting portion 3062 abuts against the upper end surface of the pressing block 307, thereby improving the transmission stability.

To reduce the clamping space quickly, the clamping mechanism 1300 further includes a reset structure, where the reset structure is in a compressed state when the locking rod 1301 moves downward relative to the output shaft sleeve 302. When the user rotates the operating member 305 in a reverse direction, the restoring force provided by the reset structure can make the pressing rod 306, the pressing block 307, and the locking rod 1301 move rapidly toward the direction that the clamping space is reduced so that the locking rod 1301 can be quickly restored from the state shown in FIG. 39 to the state shown in FIG. 38.

In some examples, the reset structure includes a first elastic member 308 and a second elastic member 309 disposed in the support sleeve 303, where the first elastic member 308 has the tendency to make the pressing block 307 drive the pressing rod 306 to move away from the clamping space, and the second elastic member 309 has the tendency to make the pressing rod 306 drive the locking rod 1301 to move in the direction that the clamping space is reduced. The two elastic members are provided so that after the work attachment 1400 is replaced or mounted, all the pressing block 307, the pressing rod 306, and the locking rod 1301 can be quickly reset to the position at which the work attachment 1400 is locked. Compared with the case where one elastic member is provided for each of the pressing block 307, the pressing rod 306, and the locking rod 1301, in the example of the present application, only the first elastic member 308 and the second elastic member 309 are provided so that the structure is simpler.

The first elastic member 308 transmits a force to make the clamping mechanism 1300 switch between a clamping state and an unlocking state, and the state change of the first elastic member 308 changes the size of the clamping space formed by the clamping mechanism 1300 and used for clamping the work attachment 1400.

In some examples, as shown in the figure, the first elastic member 308 is a first coil spring, the first coil spring is sleeved on the outside of the output shaft sleeve 302 and the pressing block 307, an end of the first coil spring is connected to the pressing block 307, and the other end of the first coil spring is fixed relative to the output shaft sleeve 302. The second elastic member 309 is a second coil spring, the second coil spring is located in the through hole, an end of the second coil spring is connected to the pressing rod 306, and the other end of the second coil spring is connected to the locking rod 1301. In other examples, the first elastic member 308 and the second elastic member 309 may also be elastic structures such as spring sheets and memory alloy sheets in addition to coil springs.

In some examples, the other end of the first coil spring is fixedly connected to the output shaft sleeve 302. In some other examples, to improve the structural compactness of the entire clamping mechanism 1300, the height of the clamping mechanism 1300 in the vertical direction is reduced, the top end of the oscillating member 203 abuts against the bottom surface of the output shaft sleeve 302, an annular mounting groove is provided on the oscillating member 203, and the other end of the first coil spring penetrates through the output shaft sleeve 302 and is connected in the annular mounting groove.

In some examples, a limiting groove is disposed on one of the outer wall surface of the pressing block 307 and the inner wall surface of the support sleeve 303, a limiting block 3071 is disposed on the other one of the outer wall surface of the pressing block 307 and the inner wall surface of the support sleeve 303, and the limiting block 3071 is slidably connected to the limiting groove.

The work attachment 1400 has a locked state (that is, the state shown in FIG. 38) in which the work attachment 100 is locked in the clamping space. In some examples, when the work attachment 1400 is in the locked state, the spring force of the first coil spring is 1200 N to 1300 N, and the length of the first coil spring is 14 mm to 16 mm. In a specific example, when the work attachment 1400 is in the locked state, the spring force of the first coil spring is 240 N, and the length of the first coil spring is 15 mm.

In some examples, a height M1 of the support sleeve 303 is greater than or equal to 15 mm and less than or equal to 35 mm. Optionally, the height M1 of the support sleeve 303 is greater than or equal to 20 mm and less than or equal to 30 mm. In some specific examples, M1 may be 24 mm, 25.5 mm, or 26.5 mm.

In some examples, the oscillating power tool further includes a transmission box 1500, where the transmission box 1500 is disposed in the housing 110 and used for mounting the clamping mechanism 1300. The ratio a of a height M2 of the transmission box 1500 to the height M1 of the support sleeve 303 is greater than or equal to 2 and less than or equal to 3. In some specific examples, the ratio a can be 2.4, 2.5, 2.6, or 2.7.

The present application further provides an oscillating power tool. The oscillating power tool includes the housing 110, the clamping mechanism 1300, and the power mechanism 1200. The clamping mechanism 1300 is at least partially disposed in the housing 110 and forms a clamping space in which the work attachment 1400 is clamped. The power mechanism 1200 includes the electric motor 201 and the oscillating member 203. The electric motor 201 can drive the oscillating member 203 to move. The oscillating member 203 drives the work attachment 1400 to oscillate around the first straight line b. The clamping mechanism 1300 includes the first bearing 304 and the second bearing 310. The first bearing 304 is disposed on the upper side of the oscillating member 203, and the second bearing 310 is disposed on the lower side of the oscillating member 203. The clamping mechanism 1300 further includes the output shaft sleeve 302, the oscillating member 203 drives the output shaft sleeve 302 to rotate, and the work attachment 1400 moves along with the output shaft sleeve 302. The clamping mechanism 1300 further includes the support sleeve 303 connected to an end of the output shaft sleeve 302, the second bearing 310 supports the output shaft sleeve 302, the clamping mechanism 1300 further includes the first elastic member 308 for transmitting the force to make the clamping mechanism 1300 switch between the clamping state and the unlocking state, and the first elastic member 308 is at least partially disposed outside the output shaft sleeve 302.

The working process of the oscillating power tool includes a mounting process of the work attachment 1400 and an oscillating process of the work attachment 1400.

The mounting process of the work attachment 1400 is specifically as follows: first, the operating member 305 is rotated to the state shown in FIG. 39; at this time, the clamping space between the first clamping portion 3011 and the second clamping portion 3021 is the largest; then, an end of the work attachment 1400 at which a second clamping groove 401 is provided is inserted between the first clamping portion 3011 and the second clamping portion 3021, and the second clamping groove 401 is clamped to the locking rod 1301; finally, the operating member 305 is rotated in the reverse direction to the state shown in FIG. 38; at this time, the locking rod 1301 is driven by the reset structure to be automatically reset, the clamping space between the first clamping portion 3011 and the second clamping portion 3021 becomes smaller, and the work attachment 1400 is clamped in the clamping space so that the work attachment 1400 and the oscillating power tool are assembled.

The oscillating process of the work attachment 1400 is specifically as follows: the electric motor 201 is powered on, the motor shaft of the electric motor 201 rotates and drives the ball sleeve 202 to rotate, and the oscillating member 203 is driven by the ball sleeve 202 to oscillate left and right in the horizontal plane and drives the output shaft sleeve 302 to rotate left and right around the axis; since the limiting teeth 3023 engage with the limiting holes 402, the locking rod 1301 can rotate synchronously with the output shaft sleeve 302 so that the work attachment 1400 oscillates left and right in the horizontal plane, and thus the cutting end of the work attachment 1400 can perform the cutting operation.

Compared with the existing oscillating power tool, the oscillating power tool provided in the present application has the advantages described below. First, the vibration of the whole machine is reduced, the moment of inertia is reduced from about 60 kg·mm$^2$ commonly in the existing products to 45 kg·mm$^2$ or less, and the moment of inertia is reduced by about 24%. Second, the performance of the whole machine is improved. When the oscillation angle of the work attachment 1400 is 1.8 degrees and the rotational speed of the electric motor 201 is as high as 20000 RPM, the oscillating power tool can still satisfy the requirements for life and quality. As for the oscillating power tool in which the solution is not adopted, the vibration when the rotational speed of the electric motor 201 reaches 16000 RPM is very large; if the rotational speed of the electric motor 201 continues increasing, the oscillating power tool will be damaged, so the oscillating power tool cannot satisfy the requirements for life and quality. Third, the cutting efficiency is improved. When the oscillating power tool is equipped with the work attachment 1400 for vertical slotting, the cutting time can be shortened from more than 5 seconds to less than 3 seconds. Fourth, the cost is reduced by about 30% than the cost of the clamping mechanism 1300 of the original oscillating power tool. Fifth, the volume and weight of the whole machine are reduced. Sixth, the operation of the user is labor-saving, and it is not easy to pinch hands.

Apparently, the preceding examples of the present application are merely examples for a clear description of the present application and are not intended to limit implementations of the present application. For those of ordinary skill in the art, changes or alterations in other different forms may also be made based on the preceding description. All examples cannot be and do not need to be exhausted herein. Any modifications, equivalent substitutions, and improvements made within the spirit and principle of the present application fall within the scope of the claims of the present application.

The basic principles, main features, and advantages of the present application are shown and described above. It is to be understood by those skilled in the art that the preceding examples do not limit the present application in any form, and all technical solutions obtained through equivalent substitutions or equivalent transformations fall within the scope of the present application.

What is claimed is:

1. A power tool, comprising:
a housing;
a motor rotatable around a motor axis;
a ball sleeve sleeved on a motor shaft and driven by the motor shaft to move;
an oscillating member driven by the ball sleeve to oscillate; and
an output shaft driven by the oscillating member to rotate around an output shaft axis; and
a first bearing assembly and a second bearing assembly sleeved on the output shaft;
wherein the oscillating member comprises a mounting portion sleeved on the output shaft, the first bearing assembly is located on an upper side of the mounting portion, the second bearing assembly is located on a lower side of the mounting portion, the oscillating member and the ball sleeve are engaged in an engagement region on the oscillating member, a geometric center of the engagement region is defined as an engagement center, a first plane bisects the first bearing assembly along a direction of the output shaft axis, the first plane is perpendicular to the output shaft axis, a second plane bisects the second bearing assembly along the direction of the output shaft axis, the second plane is perpendicular to the output shaft axis, a height from the engagement center to the first plane is a first height H1, a height from the engagement center to the second plane is a second height H2, and a ratio H1/H2 of the first height H1 to the second height H2 is greater than or equal to 0.5 and less than or equal to 1.4.

2. The power tool of claim 1, wherein the ratio H1/H2 of the first height H1 to the second height H2 is greater than or equal to 0.6 and less than or equal to 1.4.

3. The power tool of claim 1, wherein a difference between the first height H1 and the second height H2 is less than or equal to 10 mm.

4. The power tool of claim 1, wherein the first bearing assembly comprises a first bearing, and the second bearing assembly comprises a second bearing.

5. The power tool of claim 4, wherein the first bearing assembly further comprises a third bearing, and the third bearing is located above the first bearing.

6. The power tool of claim 4, wherein the second bearing assembly further comprises a fourth bearing, and the fourth bearing is located below the second bearing.

7. The power tool of claim 1, wherein a third plane perpendicular to the output shaft axis exists, the third plane bisects the mounting portion along the direction of the output shaft axis, a distance from the engagement center to the third plane is a third distance H3, and the third distance H3 is less than or equal to 12 mm.

8. The power tool of claim 1, wherein the engagement center comprises a first engagement center on a left side and a second engagement center on a right side.

9. The power tool of claim 1, wherein a distance from the engagement center to the output shaft axis is a first radius R1, and the first radius R1 is less than or equal to 32 mm.

10. The power tool of claim 9, wherein the mounting portion is sleeved on an outer circumference of the output shaft, an inner radius of the mounting portion is a second radius R2, and a ratio R2/R1 of the second radius R2 to the first radius R1 is greater than or equal to 0.34 and less than 1.

11. The power tool of claim 1, further comprising a shock absorbing mechanism for performing shock absorbing on the power tool, wherein the shock absorbing mechanism comprises a first shock absorbing assembly and a second shock absorbing assembly, each of the first shock absorbing assembly and the second shock absorbing assembly comprises at least one shock absorber, a maximum span formed by the first shock absorbing assembly and the second shock absorbing assembly along a direction of the motor axis is defined as a first length T1, and the first length T1 is greater than or equal to 110 mm.

12. The power tool of claim 1, further comprising a shock absorbing mechanism for performing shock absorbing on the power tool, wherein the shock absorbing mechanism comprises a first shock absorbing assembly and a second shock absorbing assembly, a minimum distance between the first shock absorbing assembly and the second shock absorbing assembly is defined as a third length T3, the third length T3 is greater than or equal to 30 mm, each of the first shock absorbing assembly and the second shock absorbing assembly comprises at least one shock absorber, the first shock absorbing assembly has a first shock absorbing center C1, the second shock absorbing assembly has a second shock absorbing center C2, a distance from the first shock absorbing center C1 to the output shaft axis is defined as a first distance L1, a distance from the second shock absorbing center C2 to the first shock absorbing center C1 is defined as a second distance L2, and a ratio of the first distance L1 to the second distance L2 is less than or equal to 0.27.

13. The power tool of claim 1, wherein the oscillating member and the ball sleeve are engaged in the engagement region on the oscillating member, the geometric center of the engagement region is defined as the engagement center, and a distance from the engagement center to the output shaft axis is a first radius R1, wherein the first radius R1 is less than or equal to 32 mm.

14. The power tool of claim 1, further comprising a fan for heat dissipation, wherein the fan comprises fan blades, a base plate, and a support portion, the fan blades are arc-shaped, each of the fan blades comprises a root and a tail, the root is connected to the support portion, an airflow flows out along the tail, and the fan blades are partially integrated into the base plate and partially exposed from the base plate.

15. The power tool of claim 14, wherein a circle formed by connecting tails of a plurality of fan blades is defined as an outer circle, a diameter of the base plate is a first diameter d1, a diameter of the outer circle is a second diameter d2, and a ratio of the second diameter d2 to the first diameter d1 is greater than or equal to 1.05 and less than or equal to 1.18.

16. A power tool, comprising:
a housing;
a motor rotatable around a motor axis;
a ball sleeve sleeved on a motor shaft and driven by the motor shaft to move;
an oscillating member driven by the ball sleeve to oscillate;
an output shaft driven by the oscillating member to rotate around an output shaft axis, and
a first bearing assembly and a second bearing assembly sleeved on the output shaft;
wherein the oscillating member comprises a mounting portion sleeved on the output shaft, the first bearing assembly is located on an upper side of the mounting portion, the second bearing assembly is located on a lower side of the mounting portion, the oscillating member and the ball sleeve are engaged in an engagement region on the oscillating member, a geometric center of the engagement region is defined as an engagement center, a first plane bisects the first bearing assembly along a direction of the output shaft axis, the first plane is perpendicular to the output shaft axis, a second plane bisects the second bearing assembly along the direction of the output shaft axis, the second plane is perpendicular to the output shaft axis, a height from the engagement center to the first plane is a first height H1, a height from the engagement center to the second plane is a second height H2, and a difference between the first height H1 and the second height H2 is less than or equal to 10 mm.

17. The power tool of claim 16, wherein a ratio H1/H2 of the first height H1 to the second height H2 is greater than or equal to 0.6 and less than or equal to 1.4.

18. The power tool of claim 16, wherein the difference between the first height H1 and the second height H2 is greater than 3 mm and less than or equal to 10 mm.

19. The power tool of claim 16, wherein a distance from the engagement center to the output shaft axis is a first radius R1, wherein the first radius R1 is less than or equal to 32 mm.

20. The power tool of claim 19, wherein the oscillating member comprises the mounting portion, the mounting portion is sleeved on an outer circumference of the output shaft, and an inner radius of the mounting portion is a second radius R2, wherein a ratio R2/R1 of the second radius R2 to the first radius R1 is greater than or equal to 0.34 and less than 1.

* * * * *